(12) United States Patent
Mahler et al.

(10) Patent No.: US 6,542,504 B1
(45) Date of Patent: Apr. 1, 2003

(54) PROFILE BASED METHOD FOR PACKET HEADER COMPRESSION IN A POINT TO POINT LINK

(75) Inventors: Jerry J. Mahler, Prospect Heights, IL (US); Jacek A. Grabiec, Chicago, IL (US); Michael S. Borella, Naperville, IL (US); Ikhlaq S. Sidhu, Vernon Hills, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,845

(22) Filed: May 28, 1999

(51) Int. Cl.$^7$ .......................... H04L 12/28; H04L 12/56
(52) U.S. Cl. .................. 370/392; 370/401; 709/247
(58) Field of Search ................................ 370/230, 235, 370/252, 352, 389, 392, 394, 400, 401, 412, 466, 470, 474, 477; 375/240; 709/246, 247

(56) References Cited

U.S. PATENT DOCUMENTS

| | | | | |
|---|---|---|---|---|
| 5,978,386 A | * | 11/1999 | Hamalainen et al. | 370/466 |
| 6,134,245 A | * | 10/2000 | Scarmalis | 370/474 |
| 6,408,001 B1 | * | 6/2002 | Chuah et al. | 370/392 |

OTHER PUBLICATIONS

Casner, S. et al., "Compressing IP/UDP/RTP Headers for Low–Speed Serial Links", *Network Working Group, Request for Comments 2508*, Feb., 1999, pp. 1–24.
Koren, Tmima et al., "Tunneled Multiplexed Compressed RTP ("TCRTP"), *Audio/Video Transport Working Group, Internet Draft*, draft–wing–avt–tcrtp–00.text, Jun. 25, 1999, pp. 1–21.
Townsley, W. et al., "Layer Two Tunneling Protocol (L2TP)", *Network Working Group, Request for Comments 2661*, Aug., 1999, pp. 1–80.
Kent, S. et al., "IP Encapsulating Security Payload (ESP)", *Network Working Group, Request for Comments 2406*, Nov. 1998, pp. 1–22.
Simpson, W., "The Point–to–Point Protocol (PPP)", *Network Working Group, Request for Comments 1661*, Jul. 1994, pp. 52.
Calhoun, Pat R., et al., "Layer Two Tunneling Protocol "L2TP" Security Extensions for Non–IP Networks", *PPP Working Group, Internet Draft*, draft–ietf–pppext–l2tp–sec–04.txt, Jul. 1998, pp. 1–13.
Kent, S. et al., "Security Architecture for the Internet Protocol", *Network Working Group, Request for Comments 2401*, Nov. 1998, pp. 1–66.
Srisuresh, P., et al., "Policy Framework for IP Security", *IPSec Working Group, Internet Draft*, draft–ietf–ipsec–policy–framework–00.txt, Feb. 1999, pp. 1–10.
McGregor, G., The PPP Internet Protocol Control Protocol (IPCP), *Network Working Group, Request for Comments 1332*, May 1992, pp. 1–12.

* cited by examiner

*Primary Examiner*—Alpus H. Hsu
*Assistant Examiner*—Duc Ho
(74) *Attorney, Agent, or Firm*—McDonnell Boehnen Hulbert & Berghoff

(57) ABSTRACT

A method is shown for compression of packet header information of packets transmitted on a point to point link. First and second endpoints of the point to point link negotiate a profile for packet header information for packets transmitted from the first endpoint to the second endpoint on the point to point link. The profile includes a predetermined default value for a predetermined header field of the packet header information. A packet sent from the first endpoint to the second endpoint over the point to point link includes a profile identifier for the profile and excludes the predetermined header field. The second endpoint uses the profile identifier to access the profile. The second endpoint then uses the predetermined default value for the predetermined header field from the profile to decode the packet.

25 Claims, 21 Drawing Sheets

PROFILE BASED METHOD FOR PACKET HEADER COMPRESSION IN A POINT TO POINT LINK

FIELD OF INVENTION

The present invention relates to data communications. More specifically, it relates to the transmission of packet on a point to point communication link.

BACKGROUND OF THE INVENTION

Connection oriented communication links, such as point to point links, are an increasingly common feature of network infrastructures. One reason for this is the emergence of Voice over IP (VoIP), otherwise known as internet telephony. An increasing amount of local area network (LAN) and wide area network (WAN) traffic consists of VoIP packets.

VoIP typically combines several protocols in order to obtain the benefit of certain features of each type of protocol. A typical VoIP packet will include headers for the Internet Protocol (IP), User Datagram Protocol (UDP) and Real-time Transport Protocol (RTP). IP provides for unique addressing of source and destination hosts across multiple networks and routing of packets between hosts across multiple networks. UDP is a transport protocol that provides for a datagram or connectionless mode of communication for delivery of packets to a destination. RTP provides sequencing support for the transport of real-time data over packet switched networks. For more information regarding these protocols and internet telephony, see the Internet Engineering Task Force site at www.ietf.org.

It can be shown that uncompressed IP/UDP/RTP VoIP traffic carried through a point to point link, such as a Layer 2 Tunneling Protocol (L2TP) tunnel, can contain on the order of 1000% overhead from packet headers. FIG. 1 illustrates a network architecture 50 where a prearranged L2TP tunnel 80 is the point to point link between network servers 62 and 72. FIG. 2 illustrates fields of a tunnel packet 90 sent over L2TP tunnel 80 to demonstrate the level of overhead that is incurred.

In architecture 50, a Local Area Network (LAN) 60 includes a network server 62 that is connected to public IP network 70 and a remote access server 64. Network server 72 is operated by an internet service provider (ISP) that permits end users, such as end user 74, to access the public IP network 70.

End user 74 desires a connection to a database residing on LAN 60. While it is possible for end user 74 to dial directly into RAS 64, where RAS 64 will authenticate end user 74 before permitting the user access to LAN 60. However, the direct dial-in connection will often be a costly long distance call through the public switched telephone network (PSTN).

The end user 74 also has local dial-up access to network server 72. Network server 72 is connected to network server 62 of LAN 60 through IP network 70, but a security firewall is in place to prevent unauthorized access to LAN 60. Due to the firewall, end user 74 would not be able to gain direct access to LAN 60 because the firewall would reject his connection attempt from network server 72.

One solution is to provide end user 74 access from network server 72 to LAN 60 through a point to point link, such as L2TP tunnel 80, that provides for secure access to LAN 60 from network server 72 through network server 62.

L2TP tunnel 80 is a prearranged connection established by agreement between the company that operates remote access server 64 of LAN 60 and the ISP that operates network server 72. End user 74 dials into network server 72 which recognizes end user 74 as a tunnel client by means of an authentication protocol or a special phone number reserved for tunnel clients. Assuming that the tunnel 80 between network servers 62 and 72 already exists, a new slot within the tunnel is assigned to end user 74 for transmission of packets across IP network 70 to network server 62.

Each packet received from end user 74 includes Point-to-Point Protocol (PPP), IP INNER, Transmission Control Protocol (TCP) and File Transfer Protocol (FTP) headers along with the DATA field. Each packet from end user 74 is encapsulated in L2TP/UDP/IP headers by network server 72 before being forwarded to network server 62. The resulting tunnel packet 90 is shown in FIG. 2.

On the remote side, network server 62 strips the outer IP/UDP/L2TP headers from each tunnel packet 90 received through L2TP tunnel 80 and the resulting packet is presented to a "virtual interface" for PPP connections. The virtual interface is able to manage client connectivity using traditional mechanisms with respect to further authorization, protocol access, and packet filtering. By using the L2TP tunnel 80, end user 74 is able to present packets to RAS 64 as if he were directly dialed-in to RAS 64 although the dial-up connection is, in fact, terminated at network server 72.

As can be seen from tunnel packet 90, the overhead involved with transmission of packets through tunnel 80 can dwarf the data payload of the packet. As noted above, the overhead of the packet header information can represent as much as 1000% of the size of the data field.

Since point to point links are increasingly common among many network infrastructures, it becomes increasingly important to efficiently use the bandwidth over these links. The point to point links mentioned here may be physically point to point, such as T1 lines, or may be virtual point to point links, such as IP tunnels, in which the data is switched across an established channel that may cross multiple networks. Note that a tunnel can follow a fixed route across networks or a variable route where tunneled packets can arrive at a destination endpoint through different paths across networks.

There are three commonly used conventional techniques to reduce the overhead associated with RTP traffic streams. Two methods deal with multiplexing many RTP streams between a pair of hosts into one RTP stream. These are described in *An RTP Payload Format for User Multiplexing*, J. Rosenburg, H. Schulzrinne, IETF Internet Draft <draft-ietf-avt-aggregation-00.txt>, November 1998; and *User Multiplexing in RTP payload between IP Telephony Gateways*, B. Subbiah, S. Sengodan, IETF Internet Draft <draft-ietf-avt-mux-rtp-00.txt>, August 1998. Although this kind of multiplexing results in reduced overhead because of a reduction in the number of packet headers at layers below RTP, the technique is limiting in that only traffic between a particular pair of hosts can be multiplexed together.

The other method deals with compressing IP/UDP/RTP headers over a low bit-rate link. This approach is described in *Compressing IP/UDP/RTP Headers for Low-Speed Serial Links*, S. Casner, V. Jacobson, IETF Internet Draft <draft-ietf-avt-crtp-05.txt>, July 1998. A limitation of this method is that its compression mechanism is quite complex. A remote access server terminating just a few low bit-rate links may be able to compress and decompress IP/UDP/RTP packets in real time using this mechanism, but more processing power would be required to keep up with the compression and decompression process if the links were at higher data rates, such as those on a voice network backbone (e.g. T1, T3, OC-3, etc.).

Furthermore, the low-speed method requires shared state between the two link terminators, which are typically gateways or other large network routing systems. This shared state is updated by each packet sent. If a packet is dropped along the link, the state will be inconsistent between the two link terminators. For a modem channel, which is lossless, albeit error-prone, this method works well. However, for a lossy channel, such as an under-provisioned packet-switched network, where packets can be lost during transmission, this method suffers when packets must be dropped in order to synchronize the state between the two link terminators. Also, the amount of shared state grows as the number of hosts at each terminator grows. For a network of large size, such as a voice network, this method will not scale well. Finally, the low-speed method provides no multiplexing mechanism.

Thus, the need remains for a method for efficiently transmitting packets across a point to point link.

SUMMARY OF THE INVENTION

In accordance with preferred embodiments of the present invention, some of the problems associated with conventional transmission of packets on point to point links are overcome. One aspect of the invention includes a method for compressing packet header information on a point to point link. In addition, the method according to the present invention supports the multiplexing of packets from multiple sources onto a point to point link.

An embodiment of a method, according to the present invention, for compression of packet header information in a point to point link calls for establishing a point to point link between first and second network devices. The method then involves negotiating a first profile between the first and second network devices for packet traffic from the first network device to the second network device through the point to point link, where the first profile has a first profile identifier and a first default packet header value for a first packet header field. The method then calls for receiving a first packet in the first network device from a first endpoint coupled to the first network device, where the first packet is addressed to a second endpoint coupled to the second network device. If a value of the first packet header field of the first packet matches the first default packet header value for the first packet header field in the first profile, then the method calls for removing the first packet header field from the first packet, and sending the first packet along with the first profile identifier from the first network device to the second network device through the point to point link. The method then involves receiving the first packet along with the first profile identifier at the second network device and using the first profile identifier sent with the first packet to retrieve the first profile in the second network device. Finally, the method sets forth inserting the first default packet header value from the first profile into the first packet header field of the first packet at the second network device.

The foregoing and other features and advantages of a preferred embodiment of the present invention will be more readily apparent from the following detailed description, which proceeds with references to the accompanying drawings.

BRIEF DESCRIPTION OF THE DRAWINGS

The present invention is described in the context of an embodiment of the invention with reference to the following drawings, wherein.

DETAILED DESCRIPTION OF PREFERRED EMBODIMENTS

The present invention is directed toward a method for compressing packet headers for multiple packets multiplexed onto a point to point link.

The present invention will now be described in the context of an IP/UDP/RTP Multiplexing and Compression (IURMC) embodiment involving multiplexing of IP/UDP/RTP packets and compressing IP/UDP/RTP headers on a point to point link. The IURMC embodiment of the present invention allows IP/UDP/RTP traffic from multiple sources to be multiplexed together for transmission across the point to point link to multiple destinations. Furthermore, the IURMC embodiment of the present invention provides for compression of IP/UDP/RTP headers for transmission across the link. The compression scheme uses only a small amount of state, is relatively simple to implement, and requires no update of state between endpoints. In addition, "on-the-fly" parameter renegotiation is possible for balancing the network processing load between the terminating devices at each end of the link in over-capacity conditions, such as high processor occupancy or network congestion. The present invention is suitable for use with a variety of point to point connection channels, such as those associated with Point-to-Point Protocol (PPP), L2TP, and Point-to-Point Tunnel (PPTP) connections.

CHANNEL ARCHITECTURE

Figure 3:
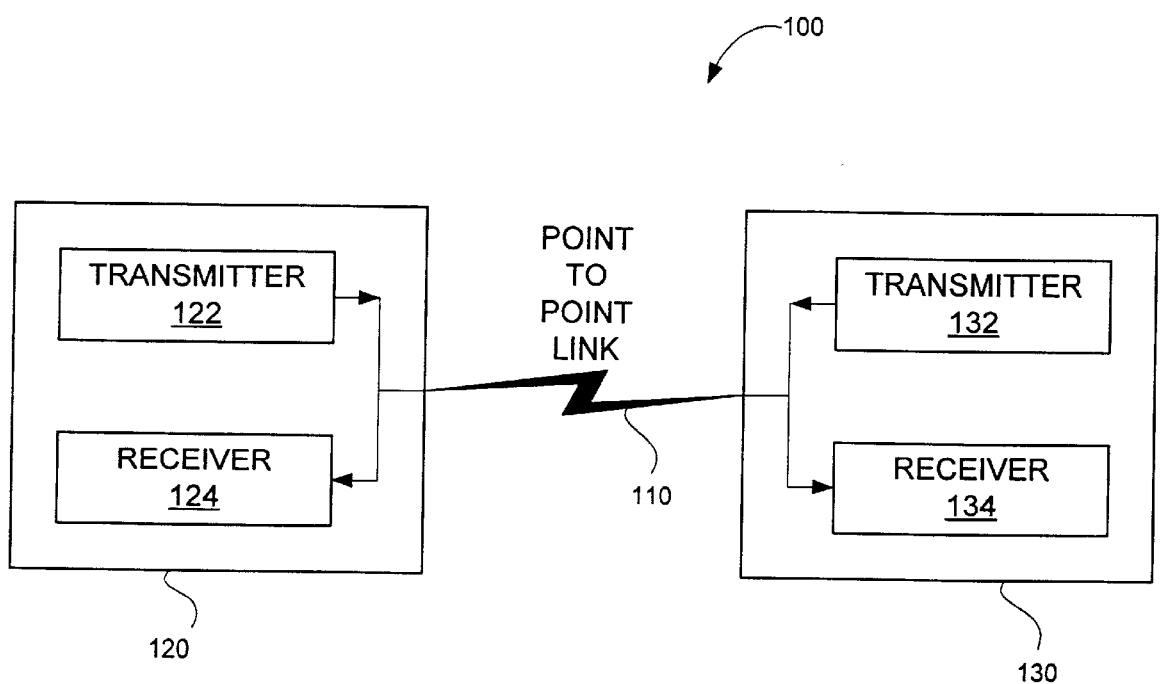
FIG. 3 is a block diagram illustrating a point to point connection according to the present invention.

FIG. 3 of the drawings illustrates an embodiment of an IURMC channel architecture 100. In architecture 100, a first endpoint 120 communicates to a second endpoint 130 through point to point link 110. Endpoint 120 includes a transmitter 122 for transmitting packets and a receiver 124 for receiving packets. Likewise, endpoint 130 includes a transmitter 132 for transmitting packets and a receiver 134 for receiving packets.

Figure 1:
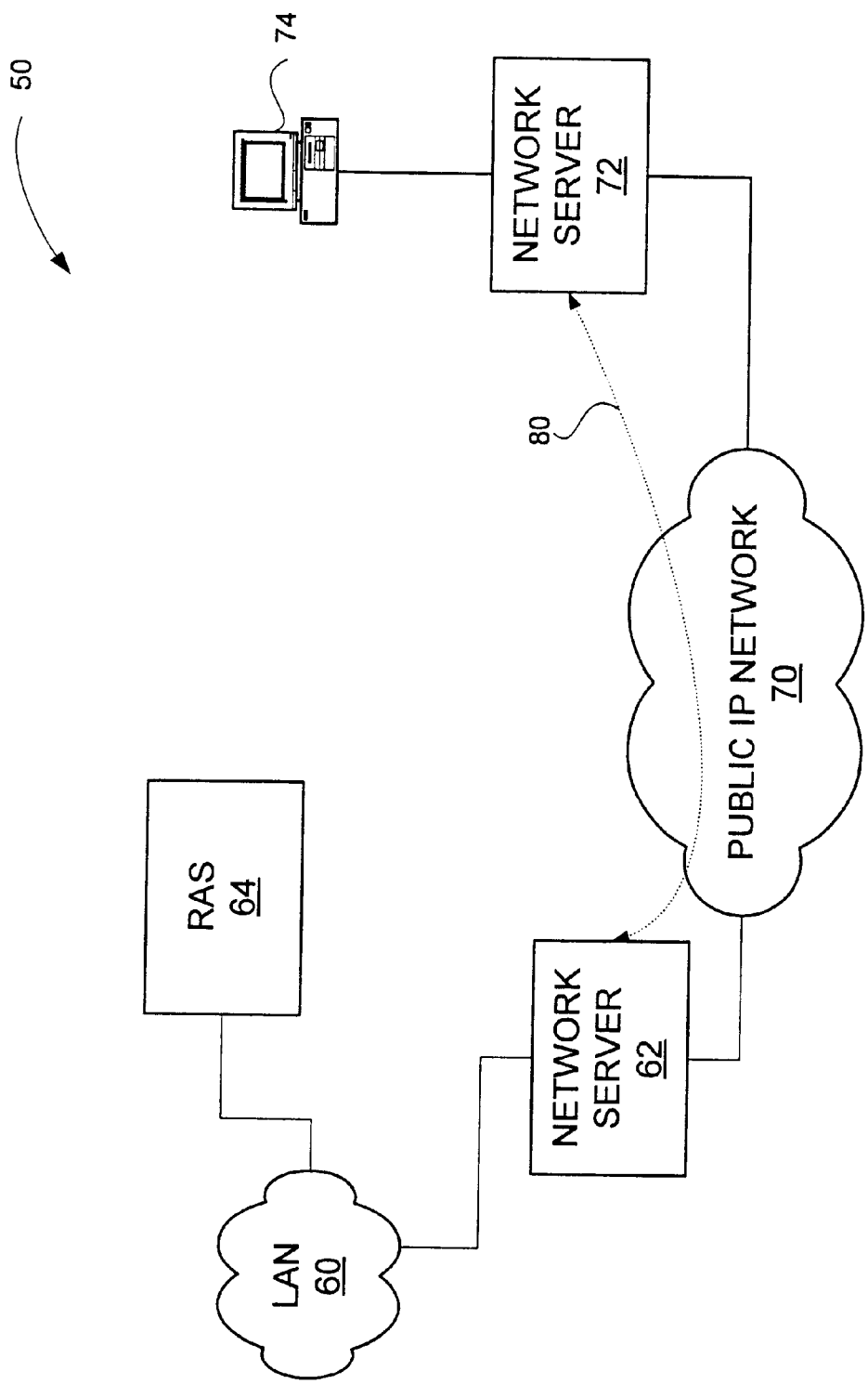
FIG. 1 is a block diagram illustrating a network architecture that features a prearranged tunnel connection.
Figure 2:
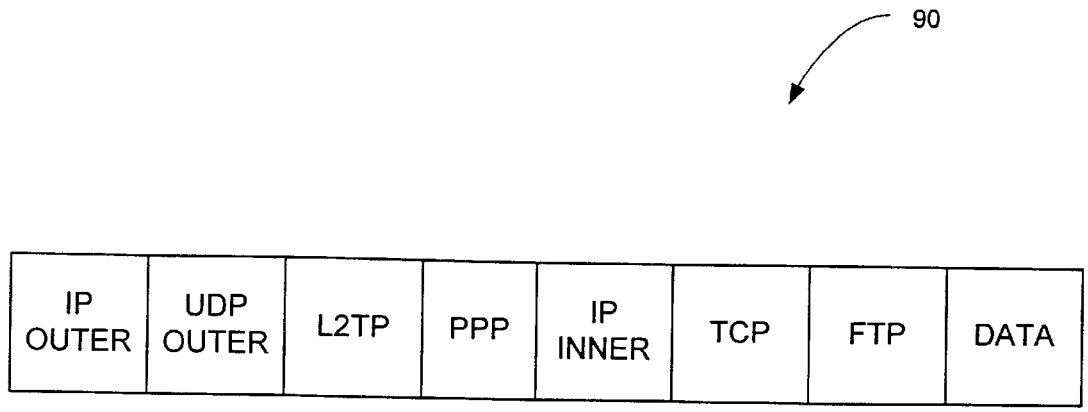
FIG. 2 is a diagram illustrating packet header fields for a tunnel packet sent over the tunnel connection of FIG. 1.

Point to point link 110 is a virtual or physical connection through one or more networks, such as the L2TP tunnel 80 of FIG. 1. Endpoints 120 and 130 are network devices, such as network access server 62 and 72 of FIG. 1, that typically provide access to a WAN, such as IP nework 70, to multiple hosts, such as end user 74.

The present invention takes advantage of similarities in packets passing between endpoints 120 and 130 over link 110. Each packet sent from one endpoint to the other includes a series of packet header fields for the communications protocols being used. The protocol, such as L2TP tunneling, supporting the point to point link 110 typically adds its own packet headers to each packet. As a result, the ratio of useful data contained in each packet compared to the overall length of the packet can be quite low.

PROFILE DEFINITION

In the present invention, the endpoints 120 and 130 negotiate a profile for the traffic passing between them. Because the packets between endpoints 120 and 130 are often very similar, they will typically have packet header fields that are often or always the same. These packet header fields can be identified, such as through statistical measure or by a network manager, and are included in the profile.

The profile will include a profile identifier to uniquely identify itself and has fields corresponding to the packet header fields. During negotiation of the profile, default values for the packet header fields that are often or always the same are established and placed in the profile, which can be accessed at both endpoints 120 and 130 of the link 110.

With the profile in place at both endpoints, the packet headers fields on packets passing across the link 110 can be compressed. Compression is obtained by removing the packet header fields from each packet that match the corresponding default values stored in the profile. The packet is then sent to the other endpoint along with the profile identifier.

Thus, in one preferred embodiment, the endpoint 120 may include a connection means for establishing a point to point link with the other endpoint 130, and it may also include a profile negotiating means for negotiating a profile with the other endpoint 130. The endpoint 120 may additionally include a storing means for storing negotiated profiles and also for storing compression options and default values for packet headers that may be used in packets travelling across the link 110. The endpoint 120 may also include a receiving means for receiving packets for transmission to the other endpoint 130 over the link 110, and a compression means for compressing packets sent over the link 110. In another preferred embodiment, the other endpoint 130 may also include similar components in order to support receiving packets, compressing packets, and sending the compressed packets across the link 110 to the endpoint 120.

At the receiving endpoint, the profile identifier is used to obtain the profile. The default values from the profile are then inserted into the corresponding packet header fields in order to reconstruct the compressed packet to its original uncompressed state. The packet is then processed by the receiving endpoint, i.e. routed, decoded, etc., as though it had never been compressed.

The method of the present invention permits the packet header information of similar packets to be compressed through use of the profile information. The efficiency of the packets transmitted across the point to point link can be increased significantly. In addition, the present method is compatible with multiplexing of packets from different sources and to different destinations, which can still further increase the packet efficiency.

Figure 4:
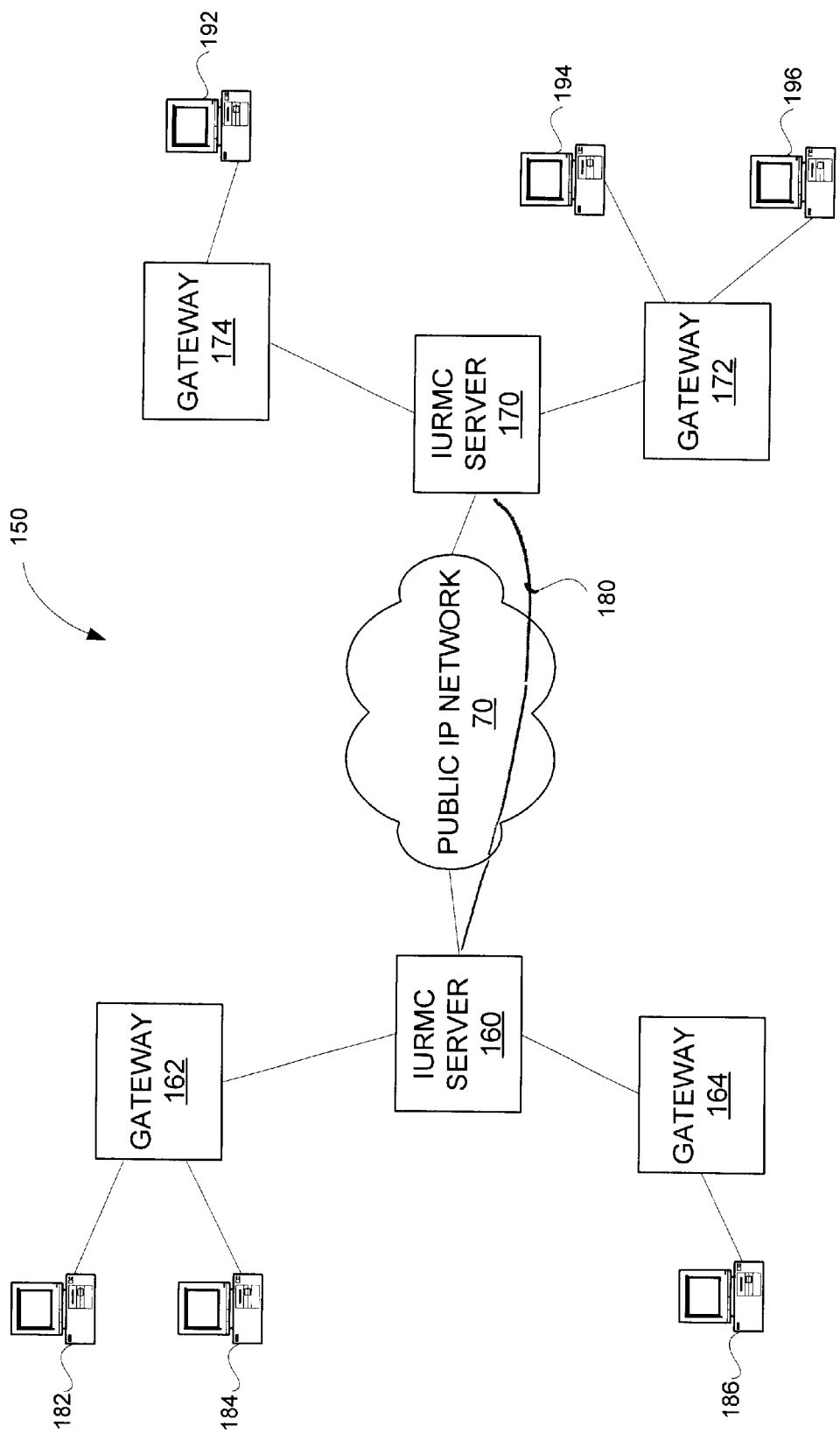
FIG. 4 is a block diagram illustrating a network architecture that features a point to point link according to the present invention.

FIG. 4 illustrates an embodiment of a network architecture 150 that is suitable for application of the method of the present invention and which employs a conventional L2TP tunnel as the point to point link 180. In architecture 150, a pair of servers 160 and 170 are connected through the public IP network 70 through a point to point link 180. For purposes of example, servers 160 and 170 are voice gateways that are configured to exchange IP/UDP/RTP packets across point to point link 180. Thus, servers 160 and 170 perform the IURMC embodiment of the method according to the present invention and point to point link 180 is an IURMC channel.

Server 160 and 170 each serve multiple gateways. Server 160 is connected to gateways 162 and 164 and server 170 is connected to gateways 172 and 174. These gateways can represent many different network devices, such as voice gateways that connect to telephone exchanges or edgeservers. Each of the gateways, in turn, serves an end user in the example of FIG. 4. Gateway 162 serves end users 182 and 184 while gateway 164 serves end user 186.

Likewise, Gateway 172 serves end user 192 while gateway 174 serves end users 194 and 196.

The establishment of the point to point link 180 is similar to that of a conventional L2TP tunnel or many other types of point to point links well understood to those of skill in the art. In servers 160 and 170, all traffic between the servers, such as packets between the end users 182, 184, 186, 192, 194 and 196, is routed through link 180. As a result, many of the packets passing through link 180 will be similar, particularly if the packets are of the same type, such as IP/UDP/RTP packets as in the present example. Note that the link 180 is established between servers 160 and 170 and is largely transparent to any intermediate network routing devices that may be present in other architectures.

For purposes of example, assume that end users 182 and 196 are actively exchanging voice data packets, as are end users 184 and 192 and end users 186 and 194. Further assume that the IP/UDP/RTP packets are VoIP packets that are either generated by the end users, such as by modems, or by the gateways 162, 164, 172 and 174 themselves, if they are voice gateways. Therefore, the packets will be very similar. For instance, the packets from end user 182 to end user 196 will have the same source and destination IP addresses, the same length (if the same codec is used), and carry the same type of traffic (i.e. RTP). Likewise, the packets for the traffic between the other end users will also be very similar.

The similarity of the traffic between the end users allows the method of the present invention to be applied to the compression of the IP, UDP and RTP headers. Therefore, instead of establishing separate IP sessions for each call between end users, an IURMC channel according to the present invention is established across point to point link 180 to carry multiplexed and compressed IP packets between the end users served by gateways 162 and 172.

In a conventional tunnel, each IP/UDP/RTP packet from one gateway to another would be encapsulated with tunnel headers to obtain an IP/UDP/L2TP/PPP/IP/UDP/RTP packet. This results in a high amount of overhead being transported. The useful data to packet length ratio is typically less than about 50%. However, in the present invention, a profile shared between the endpoints of the tunnel is used to compress the headers of each packet and multiplex packets having similar characteristics to obtain an IP/UDP/IURMC/IP/UDP/RTP packet that is much larger than the individual original packets transmitted by the end users, but which has a higher overall percentage of useful data.

To establish the IURMC channel according to the present invention, servers 160 and 170 are, for example, either configured with a profile or negotiate the profile themselves. The tunnel 180 that carries the IURMC channel is established by a network administrator or through other means well know to those of skill in the art.

IP/UDP/RTP packets from end users 182 and 184 are received by gateway 162 which forwards them to IURMC server 160 for routing over tunnel 180. Packets from end user 186 are received by gateway 164 which forwards them to IURMC server 160 for routing over tunnel 180. Packets from end user 192 are received by gateway 174 which forwards them to IURMC server 170 for routing over tunnel 180. Packets from end users 194 and 196 are received by gateway 172 which forwards them to IURMC server 170 for routing over tunnel 180.

Table 1 below illustrates an example of the IP/UDP/RTP packet header fields that are present in the packets from the end users.

TABLE 1

| Field Number | IP/UDP/RTP presence | Field(s) name(s) | Length (Bytes) |
|---|---|---|---|
| 1 | IP | 4-bit version + 4-bit header length | 1 |
| 2 | IP | 8-bit TOS | 1 |
| 3 | IP | 16-bit total length | 2 |
| 4 | IP | 16-bit ID | 2 |
| 5 | IP | 3-bit flag + 13-bit fragment offset | 2 |
| 6 | IP | 8-bit TTL | 1 |
| 7 | IP | 16-bit header checksum | 2 |
| 8 | IP | first byte of 32-bit source addr | 1 |
| 9 | IP | second byte of 32-bit source addr | 1 |

TABLE 1-continued

| Field Number | IP/UDP/RTP presence | Field(s) name(s) | Length (Bytes) |
|---|---|---|---|
| 10 | IP | third byte of 32-bit source addr | 1 |
| 11 | IP | fourth byte of 32-bit source addr | 1 |
| 12 | IP | first byte of 32-bit destination addr | 1 |
| 13 | IP | second byte of 32-bit destination addr | 1 |
| 14 | IP | third byte of 32-bit destination addr | 1 |
| 15 | IP | fourth byte of 32-bit destination addr | 1 |
| 16 | IP | variable length options list | N/A |
| 17 | UDP | 16-bit source port | 2 |
| 18 | UDP | 16-bit destination port | 2 |
| 19 | UDP | 16-bit UDP length | 2 |
| 20 | UDP | 16-bit UDP checksum | 2 |
| 21 | RTP | 2-bit version + 1-bit padding marker + 1-bit extension marker + 4-bit CSRC count | 1 |
| 22 | RTP | 1-bit marker bit + 7-bit payload type | 1 |
| 23 | RTP | 16-bit sequence number | 2 |
| 24 | RTP | 32-bit timestamp | 4 |
| 25 | RTP | 32-bit SSRC ID | 4 |
| 26 | RTP | variable length CSRC ID list | N/A |
| 27 | RTP | variable length extension | N/A |
| 28 | N/A | padding (always set to 00) | N/A |

As can be seen from Table 1, there is a considerable amount of overhead associated with IP/UDP/RTP packets. In the present invention, the fields described in Table 1 are subject to compression through the use of the profile available to the endpoints of a point to point link. However, the information in different fields may have different requirements for transmission. The profile, according to the present invention, therefore incorporates a compression field for each packet header field that describes the type of compression performed on that packet header field. Table 2 below illustrates the compression options for one embodiment of the present invention.

TABLE 2

| Value of Compression Field | Compression Scheme from Previous Section | Meaning of Compression Option |
|---|---|---|
| 1 | Option 1 | Field always sent |
| 2 | Option 2a | Field sometimes sent, default value guaranteed correct |
| 3 | Option 2b | Field sometimes sent, default value not guaranteed correct |
| 4 | Option 3a | Field never sent, default value guaranteed correct |
| 5 | Option 3b | Field never sent, default value not guaranteed correct |

To illustrate the application of the options in Table 2, not that fields 1, 3, and 21 of the Table 1 must be guaranteed to be the "correct value" to assure correct synchronization of field boundaries at the sender and receiver in the presence of variable length fields. Therefore, Compression Options 2*b* and 3*b* are illegal for Fields 1, 3, and 21. Field 28 is always set to the value 0.

A correct value is one that, when used to reconstruct a packet, will result in a valid packet. A valid packet is one in which the values of the checksum and length fields are correct in light of the values of the other header fields of the packet.

Each of the packet header fields in the profile has a corresponding Default Value field in addition to the Compression Option field. The Default Value field defines the default value for compression options 2*a*, 2*b*, 3*a*, and 3*b*. The Default Value field is of variable length, and may be of length 0. The length of this field is zero if compression option 1 from Table 2 is selected.

It is also important to note that care must be taken to avoid configuring the profile such that an invalid IURMC channel is setup. For example, if compression option 3*a* (i.e. the field is never sent and the default value in the profile is guaranteed correct) is chosen for the IP header length field (field 3 in Table 1) and the IP options field (field 16 in Table 1), an empty IP option is set as the default value for the IP options field, and the default value for the IP header length field is set at 24, then no valid packet can be formed using the profile. This will occur because, if the IP header length field is never sent, the default value of 24 will be inserted into the reconstructed packet. However, the reconstructed packet will have an IP header length of 20 resulting in an invalid packet.

Figure 5:
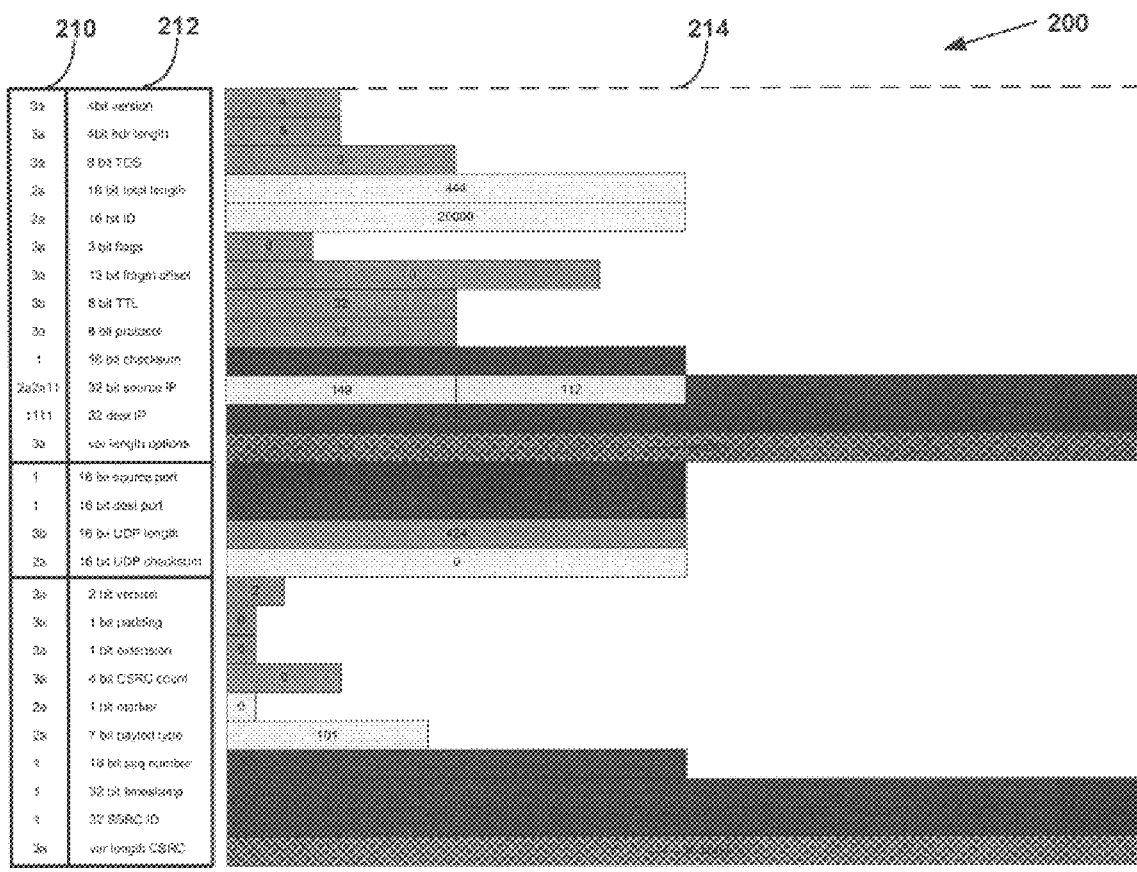
FIG. 5 is a diagram illustrating a profile according to the present invention.

A graph for an example of a profile 200 for the packet header fields of Table 1 is shown in FIG. 5. The column 210 contains the compression option from Table 2 selected for each packet header field identified in column 212. The default values defined for the fields identified in column 212 are shown within the graph bars in column 214.

Looking at profile 200, it can be seen, for example, that the 4 bit version field, as indicated in column 212, has compression option 3*a* selected in column 210. Profile 200 therefore indicates that the 4 bit version field is never sent and the default value is guaranteed. The default value for the 4 bit version field is indicated in column 214 to be 4.

Similarly, the 16 bit total length field has a compression option of 2*a* in column 210. Thus, the 16 bit total length field is sometimes sent and, when it is not sent, the default value is guaranteed to be correct. The default value in column 214 is defined as 444.

The 8 bit TTL field has a compression option of 3*b* and so is never sent and the default value, defined as 32 in column 214, is not guaranteed. Because the TTL value is never sent, the receiving endpoint will use the default value instead. Consequently, it is important that the sending endpoint take the default value into account when calculating the value in the 16 bit checksum so that it matches the checksum that will be calculated at the receiving end.

Note that some fields, such as the 32 bit source IP field, have multiple compression option values that correspond to different bytes of the field. In profile 200, the 32 bit source IP field has compression options 2*a*2*a*11. This means that the first two bytes are sometimes sent and the default values in column 214, which are 149 and 112, respectively, are guaranteed to be correct. The last two bytes are always sent.

The profile 200 is identified by a profile identifier value. Assume that the profile identifier for profile 200 of FIG. 5 is "123" for the purposes of example. In addition to the profile identifier, a fields present field is included that indicates which of the option 2*a* and 2*b* fields, i.e. the sometimes sent fields, are sent with each packet. The fields present field is a bit map having a bit for each packet header field that has compression option 2*a* or 2*b*. There are seven packet header fields in profile 200 that have compression option 2*a* selected in column 210. Therefore, there will be seven bits in the fields present field plus a bit that is included to pad the field to a byte boundary for a total of eight bits in this example.

Packet Compression

Figure 6:
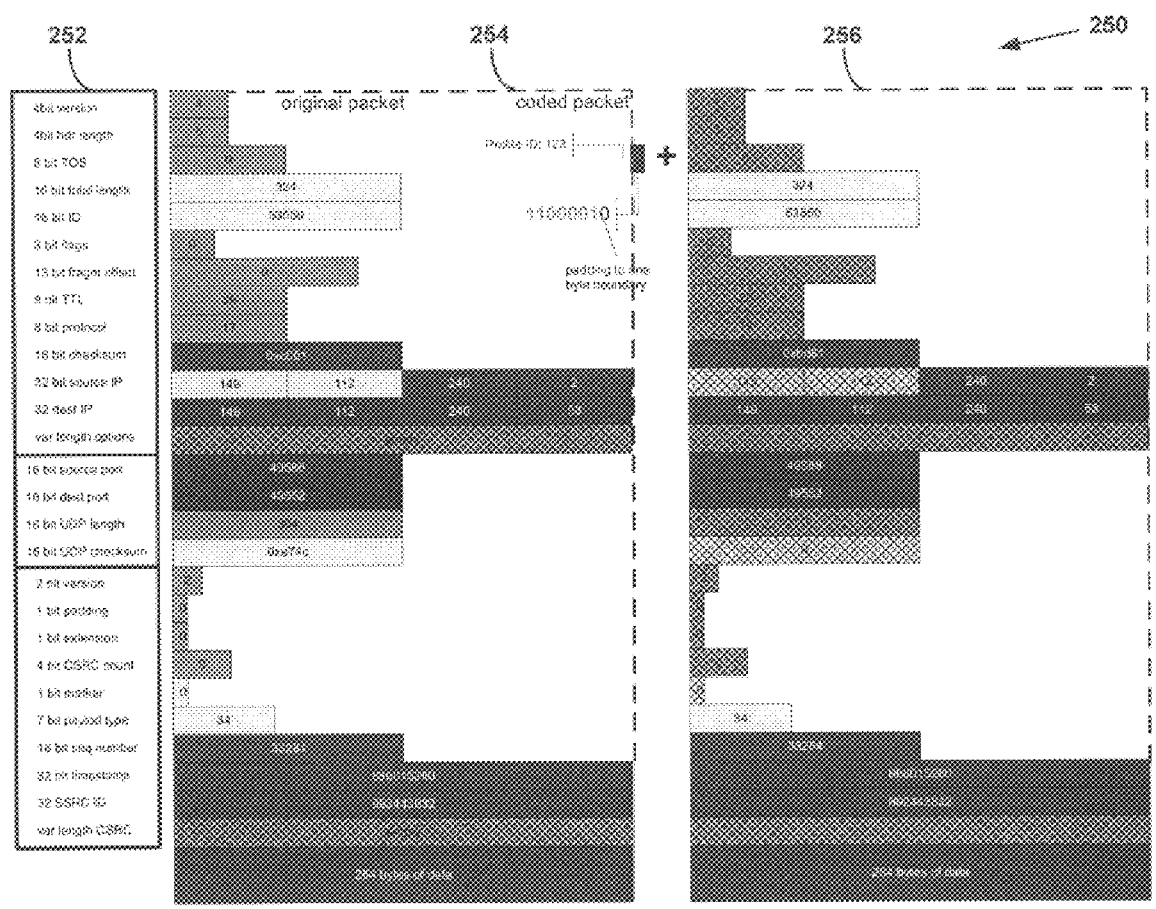
FIG. 6 is a diagram illustrating compression of a packet according to the present invention using the profile of FIG. 5.

FIG. 6 demonstrates the application of the profile 200 of FIG. 5 to a first received packet 250. The content of a received packet is shown in graphical format in column 254 of FIG. 6. The content of the packet header fields of the packet before compression are shown in column 252 and correspond to the packet header fields of the profile 200 in FIG. 5. The content of the packet header fields after compression are shown in column 256, where the removed headers are indicated by cross hatching.

Compression of the packet header fields begins with a comparison of the received packet in column 254 with profile 200. The first three fields, the 4 bit version, 4 bit header length and 8 bit TOS, are never sent and are removed from the packet, as shown in column 256. Likewise, the remaining fields that have compression option 3*a* or 3*b* in column 210 of profile 200 are also removed from column 256. Note that the default values for these fields match the default values in profile 200.

The 16 bit total length field and the 16 bit ID field, which have compression option 2*a* selected, do not match the default values defined in the profile 200. Therefore, these fields must be sent and are not removed from the packet, as shown in column 256. Since these fields are being sent, the corresponding bits in the fields present field are set. The next two fields having option 2*a* are the first two bytes of the 32 bit source IP field. These bytes match the default values defined in column 214 of profile 200 and need not be sent. The fields are therefore removed from column 256 and the corresponding bits of the fields present field are cleared. This process continues for the remaining fields in column 254 having compression option 2*a*. The resulting fields present field value is "11000010".

The fields having compression option 1 are always sent and are therefore never removed from the packet in column 256.

The resulting packet header contents in column 256 represents the header information after compression. Over twenty bytes of packet header information are removed through the use of the profile 200 at the cost of prepending the profile identifier and the fields present field, i.e. two bytes.

Figure 7:
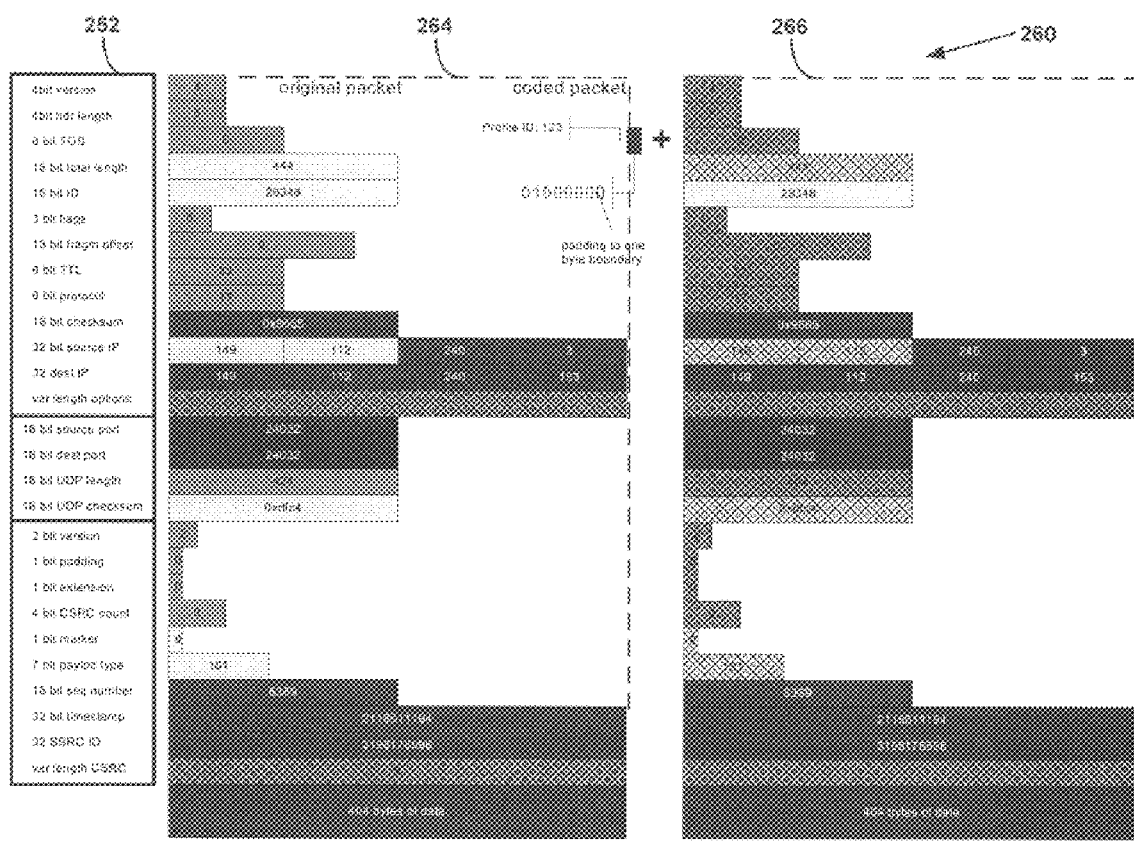
FIG. 7 is a diagram illustrating compression of a second packet according to the present invention using the profile of FIG. 5.

FIG. 7 illustrates the compression of a second packet 260 using the profile 200 of FIG. 5. The original contents of the packet is shown in column 264 while the compressed packet contents are shown in column 266. In packet 260, the 16 bit ID field is the only packet header field having compression option 2*a* whose contents, e.g. the value 29348, does not match the default values of profile 200, e.g. 20000. Therefore, this is the only optional field that must be sent and the fields present value is "01000000". Thus, the 16 bit ID field and the fields having compression option 1 are the only packet headers remaining in column 266 after compression.

Figure 8:
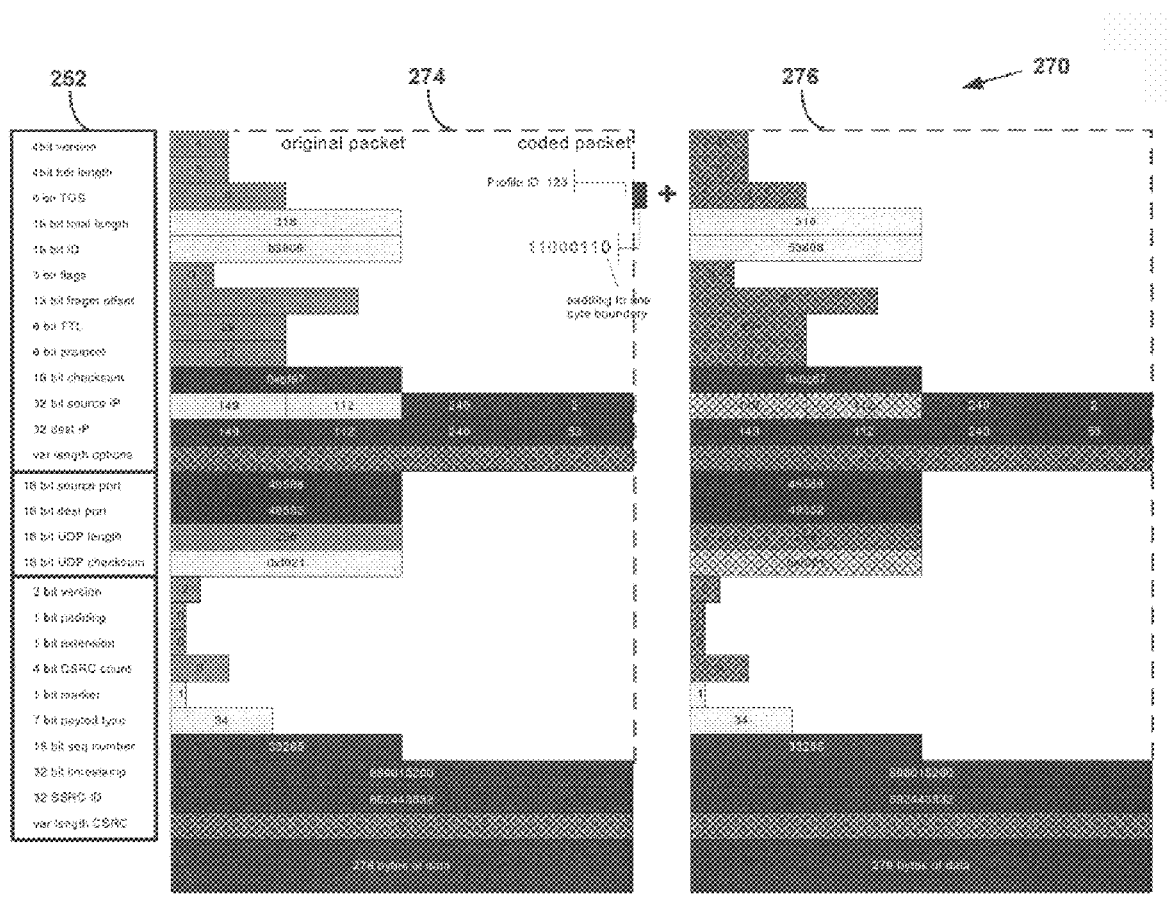
FIG. 8 is a diagram illustrating compression of a third packet according to the present invention using the profile of FIG. 5.

FIG. 8 illustrates the compression of a third packet 270 using the profile 200 of FIG. 5. The original contents of the packet is shown in column 274 while the compressed packet contents are shown in column 276. In packet 270, the 16 bit total length, 16 bit ID, 1 bit marker and 7 bit payload type fields contain values that do not match the corresponding default values of profile 200 and have compression option 2*a*. Therefore, these fields will be sent with the packet and the fields present value is "11000110". Also note that the value of the 8 bit TTL field, a compression option 3*b* field, differs from the default value in profile 200. Consequently, the sending end server must recalculate the 16 bit checksum field to match the checksum value that will be calculated on the reconstructed packet at the receiving end server. Thus, the value for the 16 bit checksum field in column 276 is changed to 0xbc67.

Figure 9:
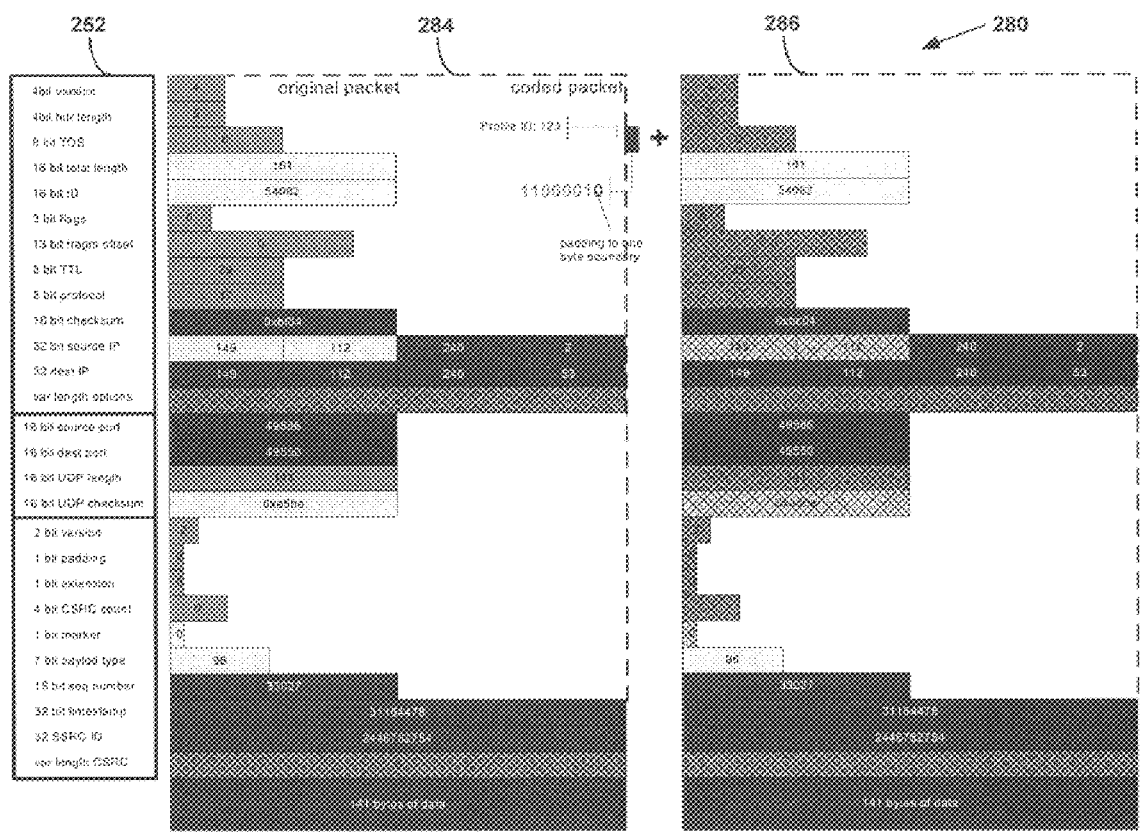
FIG. 9 is a diagram illustrating compression of a fourth packet according to the present invention using the profile of FIG. 5.

FIG. 9 illustrates the compression of a fourth packet 280 using the profile 200 of FIG. 5. The original contents of the packet is shown in column 284 while the compressed packet contents are shown in column 286. In packet 280, the same compression option 2a fields must be sent as were sent in packet 250 and the fields present value is "11000010". And, similar to packet 270, the value of the 8 bit TTL field differs from the default value in profile 200.

If the sending end is often required to recalculate the checksum and this processing burden adversely effects the sending end, then the sending end may request to establish a new profile with a new Profile ID that defines different compression options for packet header fields.

For example, the sending end server can negotiate with the receiving end to change the compression option for TTL field to option 1. This would result in the sending end transmitting the TTL field in every packet, but would eliminate the need for recalculation of the checksum for packets where the default value for a compression option 3b field does not match the value used to calculate the original checksum. The receiving end would then use the TTL value sent with the packet.

Another option is to change the compression option for the Checksum field to option 3b and set a default value in the new profile. This would indicate to the receiver that it needs to perform the checksum recalculation to ensure that the reconstructed packet is valid. In this approach, the burden for checksum calculation is shifted to the receiving end.

Yet another option is to change the compression option for the TTL field to 2a and use the same default value for the field. Then, if the value of the TTL field in the original packet is the same as the default value in the profile, then the field need not be sent and the packet would be correct without recalculating the checksum. However, if the value of the TTL field in the original packet is not the same as the default value in the profile, then the field will be sent and the checksum sent with the packet will be correct negating the need to perform any checksum recalculation. This option will require the addition of another bit to the fields present field to indicate whether the TTL field is present in the packet header data. In this particular example, since there is already one bit added for padding, no additional bit is needed but all eight bits would correspond to the presence of a field.

Figure 10:
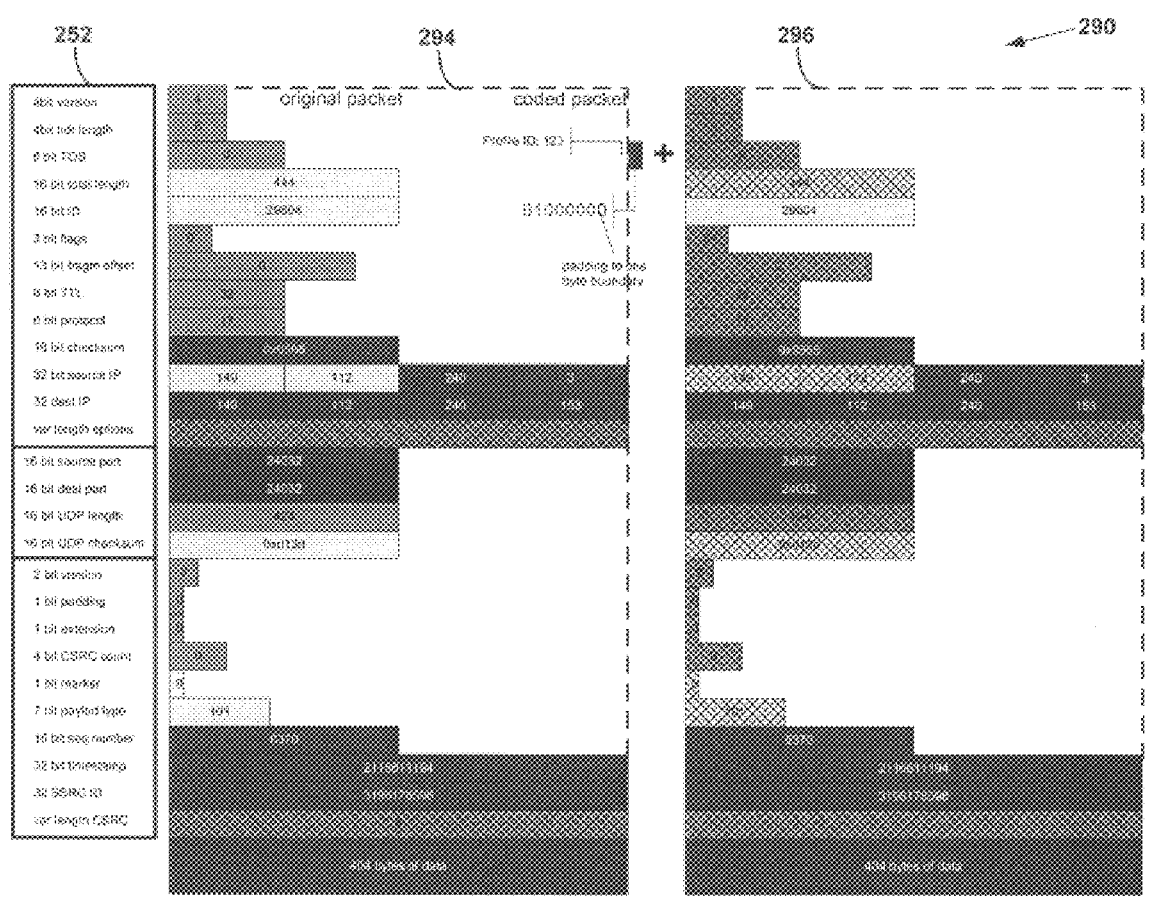
FIG. 10 is a diagram illustrating compression of a fifth packet according to the present invention using the profile of FIG. 5.

FIG. 10 illustrates the compression of a fourth packet 290 using the profile 200 of FIG. 5. The original contents of the packet is shown in column 294 while the compressed packet contents are shown in column 296. In packet 290, the only compression option 2a field that does not match profile 200 and must be sent is the 16 bit ID field. Therefore, the fields present value is "01000000". This represents a high level of compression efficiency for the profile 200 as constituted in FIG. 5.

However, notice that the value of the third byte of the 32 bit source IP field is "240" in each of the packets 250, 260, 270, 280 and 290. Likewise, the first three bytes of the 32 bit destination IP field have the values "149" "112" and "240" respectively, in all five of the packets. Therefore, greater compression efficiency can be obtained by defining a new profile where these fields are defined as option 2a fields with the corresponding values above defined as the default values. This would permit an additional four bytes of packet header information to be removed from each packet.

As can be seen from the discussion regarding the effect of compression options in the context of packets 280 and 290, the choice of compression options has a significant effect on the efficiency of the method of the present invention. The compression options can be adjusted by a network administrator monitoring the efficiency of the point to point link or the endpoint servers themselves can be configured to renegotiate the profile options themselves based on performance metrics.

It can also be seen that the present invention can be used to shift the processing burden in a network architecture. When a server operating according to the present invention begins to experience overload conditions due to the level of processing that it is performing, then it can renegotiate the profile for its IURMC links to shift some of the processing burden to its peer servers at the other end of the IURMC links. Thus, the present invention can be useful as part of an overload recovery scenario for a server. For instance, if one of the endpoint servers is experiencing an over-capacity condition, such as high processor occupancy, high levels of network traffic or similar conditions, then the endpoint can negotiate a new profile for the connection with the other endpoint of the link to shift the recalculation burden, for fields such as checksums, in order to relieve the processing load that it is experiencing. Renegotiation of the profile is discussed in further detail below.

Moving on to transmission of the packets, the compressed packets represented in columns 256, 266, 276, 286 and 296 of FIGS. 6–10, respectively, can be transmitted individually with the profile identifier value, i.e. 123, and the fields present field prepended to the packet header fields. In this case, the packet is encapsulated by the protocol headers for the tunnel or another type of point to point link and then transmitted across the point to point link. However, greater efficiency is obtained by sending multiple packets in each encapsulated tunnel packet. By multiplexing the packets, the overhead for the profile identifier and the point to point protocol headers is shared by all the packets multiplexed into a single encapsulated tunnel packet.

Packet Construction and Transmission

Figure 11:
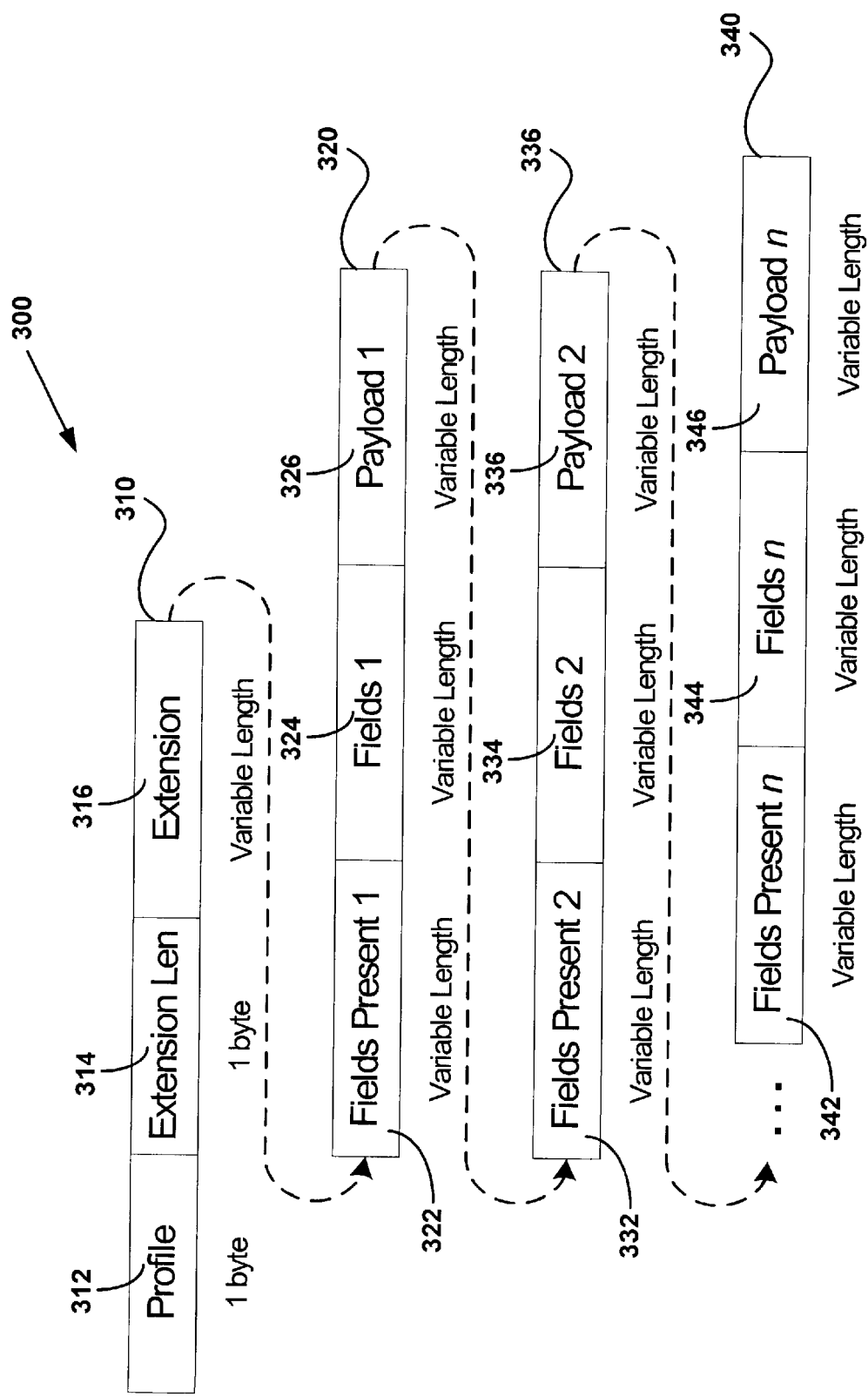
FIG. 11 is a diagram illustrating multiplexing of compressed packets according to the present invention using the profile of FIG. 5.

FIG. 11 illustrates an example of a queue 300 for a profile. The queue includes a head cell 310 that includes the profile identifier 312, an extension length field 314 and an extension 316. The profile identifier 312 of head cell 310 identifies the profile used to multiplex and compress the IP/UDP/RTP packets in the IURMC data packet queue 300. The extension length field 314 is the length of the extension field 316 and may take the values between 0 and 255. Extension 316 is a variable length field containing extension information. This field is included for extensibility of the IURMC protocol and it may contain additional information. The field may be of any length between 0 (not present) and 255.

Linked to head cell 310 of queue 300 is a series of compressed data packets 320, 330 and 340. Each compressed data packet includes a fields present field 322, 332, and 342, respectively, a packet header field 324, 334 and 344, respectively, containing the compressed packet header information for the corresponding packet, and a data payload field 326, 336 and 346, respectively.

As discussed above, each fields present field 322, 332 and 342 is a variable length field that contains an indication of which fields are present in packet header field 324, 334 and 344. The length of each fields present field 322, 332 and 342 is determined by the number of fields set to compression options 2a or 2b. The value of each bit in this field represents whether a header field is present in the packet header field 324, 334 and 344, in sequential order. A 0-bit indicates that the field is not present, while a 1-bit indicates that the field is present. Each fields present field 322, 332 and 342 is padded with 0's so that the field lines up with a byte boundary. If no fields were set to options 2a or 2b, then the length of the fields present field 322, 332 and 342 is 0.

Each packet header field 324, 334 and 344 is a list of packet header fields present, as indicated by the compression options of the profile as set through negotiation, and by the fields indicated by the corresponding fields present field 322, 332 and 342. The number of fields present in each packet header field 324, 334 and 344 must equal the number of fields set to compression option 1 in the profile plus the number of fields indicated as present by the corresponding fields present field 322, 332 and 342. The length of each packet header field is deterministic, either because the field is fixed length according to the IP, UDP, or RTP standard, or because the length is indicated by other fields.

Each data payload field 326, 336 and 346 contains the RTP payload data for the packet. The length of the data payload field is determined from the IP header field indicating total IP packet length.

Transmission of the compressed packets in queue 300 can be triggered by a variety of events. For example, the queue may have a limitation on the number of packets. Transmission of the packet for the queue could therefore be triggered by the queue becoming full. Similarly, there may be a maximum length limit on the encapsulated tunnel packet. When the compressed packets reach this limit, then transmission may be triggered.

Another parameter that may trigger transmission is the maximum delay permissible for any packet in the queue. When the oldest packet in the queue reaches the maximum delay limit, then the contents of the queue, including the oldest packet, would be transmitted.

These types of parameters can be negotiated as part of the profile setup and will be discussed in further detail below.

Figure 12:
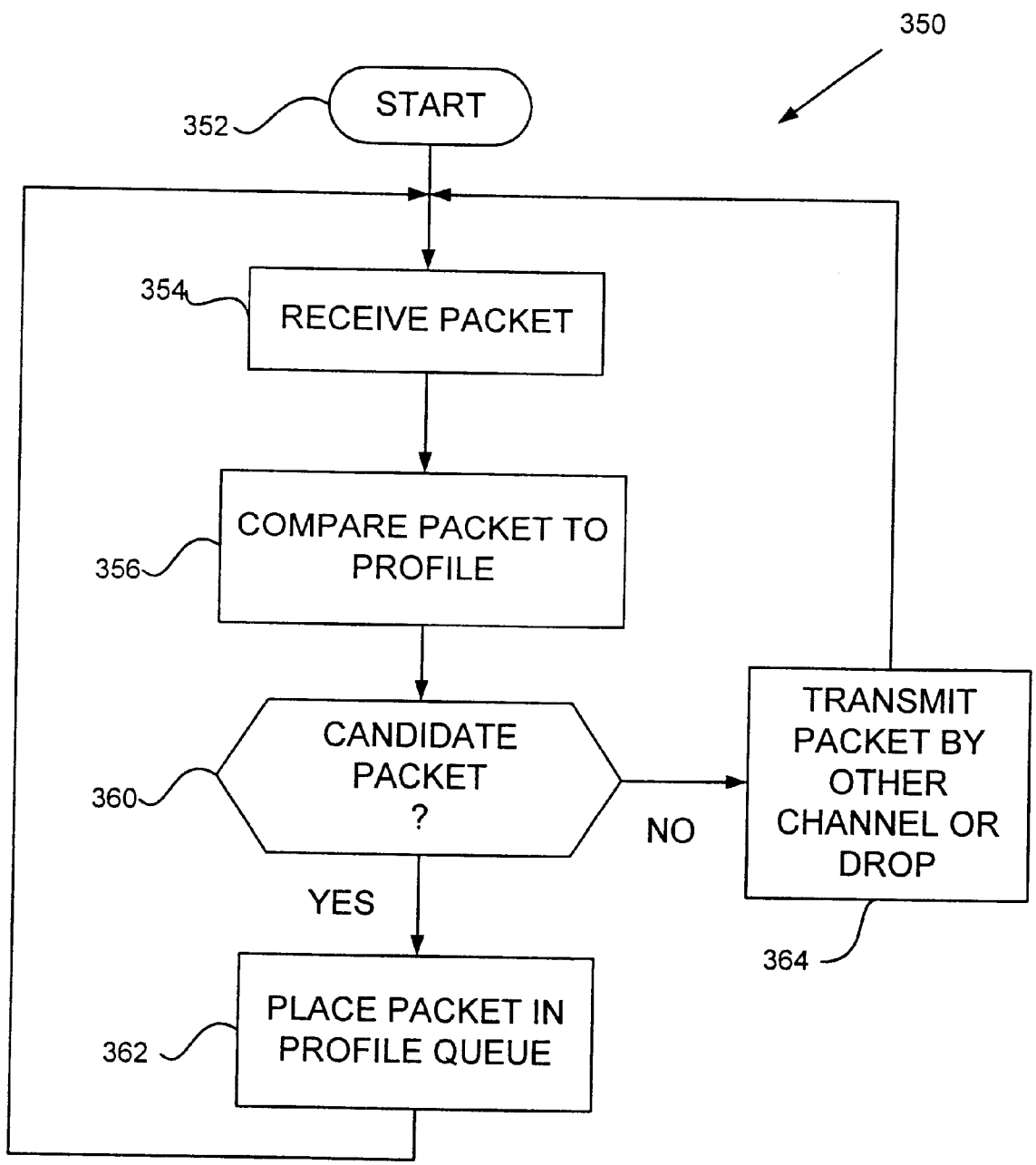
FIG. 12 is a flow diagram illustrating one embodiment of a method for identifying and queuing packets for compression using a profile according to the present invention.

FIG. 12 illustrates an embodiment of a process 350 for placing packets in the queue 300 of FIG. 11. Process 350 executes in an endpoint server, such as IURMC server 160 in FIG. 4. First, server 160 receives a packet, at step 254, from an end user, such as from end user 186 through gateway 164. The packet is compared to the profile 200 of FIG. 5 to determine whether the packet is a candidate for the queue. The packet must match the criteria defined for the profile. For instance, a packet having value for the 4 bit version and 4 bit header length fields that are different from the default values defined in profile 200 is not a candidate for the queue for profile 200. A packet having values for its packet header fields that match the default values of critical option 1 fields in the profile would be a candidate for the profile.

If the packet is a candidate for the queue for profile 200, then control flow branches at step 360 to step 362, where the packet is placed in the queue. If the packet is not a candidate, then control branches to step 364 where the packet is sent by another channel or dropped, depending upon the design.

Figure 13:
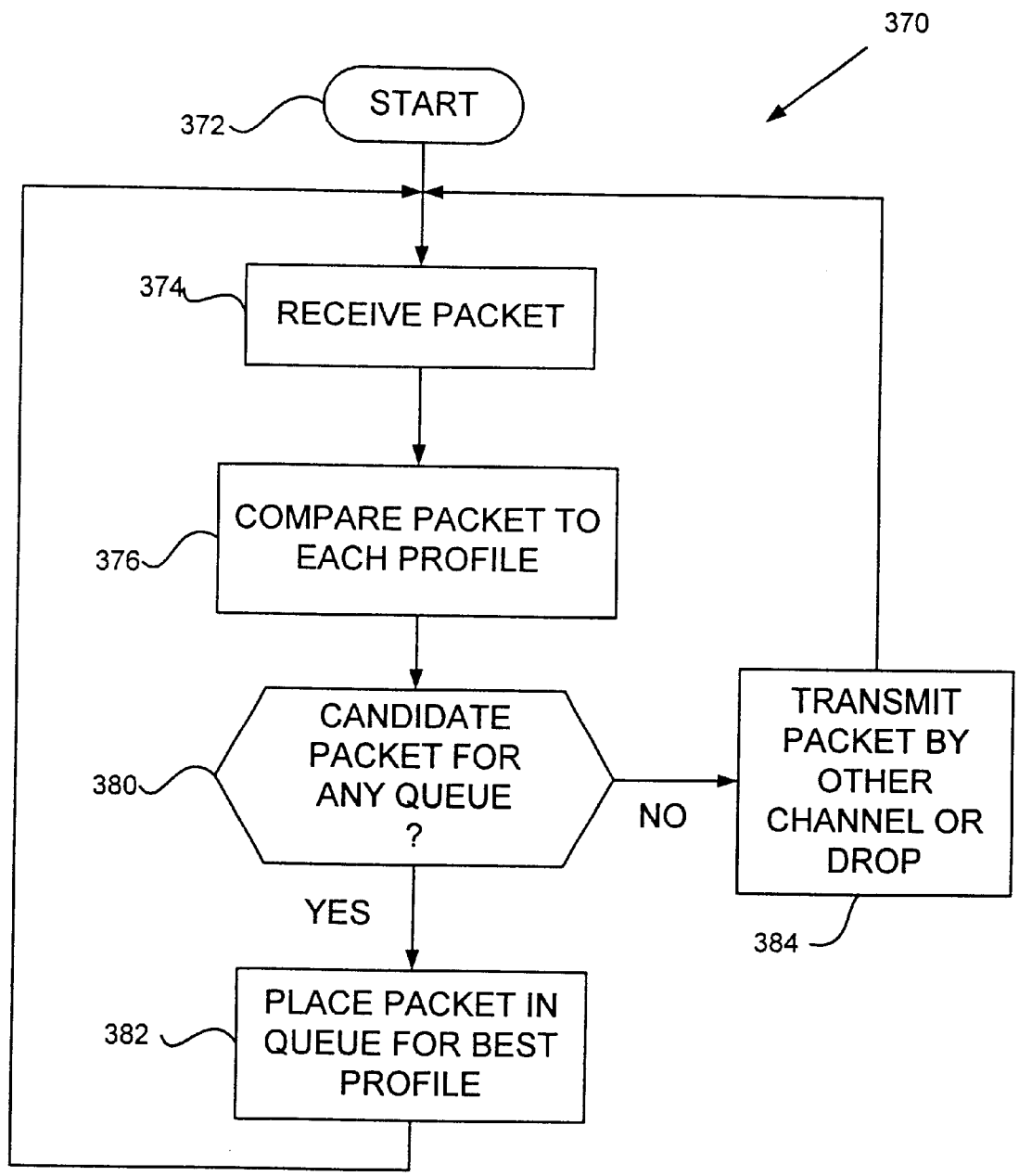
FIG. 13 is a flow diagram illustrating another embodiment of a method for identifying and queuing packets for compression using multiple profiles according to the present invention.
Figure 14:
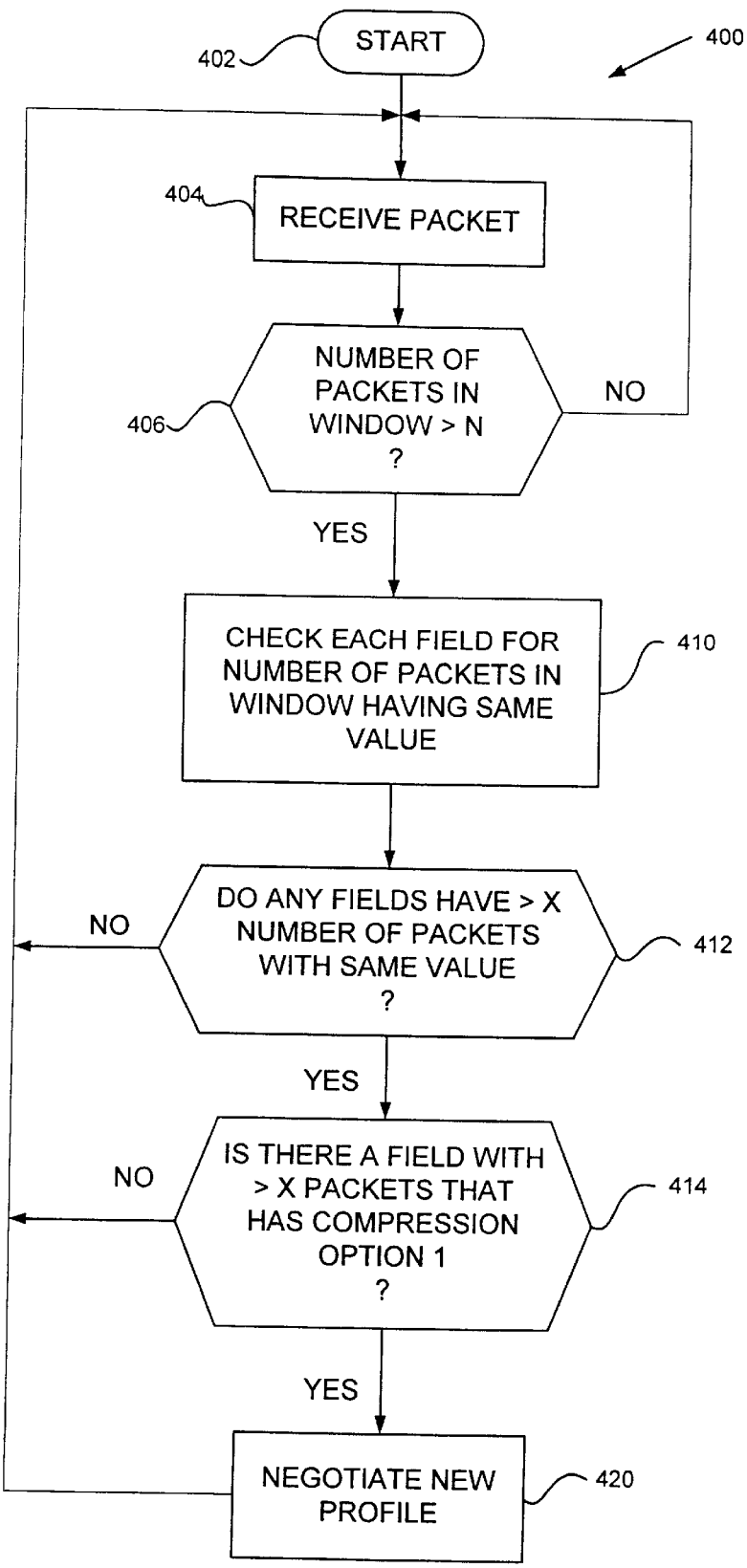
FIG. 14 is a flow diagram illustrating an embodiment of a method for identifying when to negotiate a new profile according to the present invention.

Another variation of the present invention is to employ multiple profile identifiers. This permits the use of multiple queues for different profiles. An embodiment of a process 370 for assigning packets to multiple queues is shown in FIG. 13.

At step 374, packets are received by a first endpoint server, such as server 160 of FIG. 4, having multiple profiles for transmission over the point to point link. At step 376, each received packet is compared to each of the profiles available in the server to determine if the packet meets the criteria of any available profile. If the packet is not a candidate for any of the profiles, then control branches at step 380 to step 384, where the packet is transmitted by another channel or dropped. If the packet does meet the criteria of at least one profile, then control branches to step 382 where the packet is placed on the queue for the profile that provides the highest level of packet header compression.

Packet Reconstruction

Once a packet is transmitted from one endpoint of a point to point link to the other endpoint, i.e. from server 160 to server 170 over link 180, then the compressed packets must be reconstructed. As discussed above with respect to FIG. 1, when an encapsulated packet arrives at the terminating endpoint of the point to point link, the outer headers that were added for transmission through the point to point link are stripped off. The outer IP/UDP headers, as well as the L2TP/PPP headers are stripped off the packet. Processing then proceeds on the enclosed packet or packets using the profile identifier within the point to point packet.

Figure 15:
FIG. 15 is a diagram illustrating a contents of a packet compressed according to the present invention for transmission through a point to point link.

FIG. 15 illustrates a compressed packet 450 received at the terminating endpoint that corresponds to the packet 250 from FIG. 6. The packet is preceded by a profile identifier field 452 and a fields present field 454. The profile identifier, e.g. "123", identifies the specific profile to be applied as a template to the compressed inner IP/UDP/RTP packet headers of packet 450. The contents of each packet header field of packet 450 is shown within a box corresponding to the header field. The lightly shaded boxes indicate the compression option 2a fields 16 bit total length, 16 bit ID and payload type that were identified in FIG. 6 as values that differed from the default values of profile 200 of FIG. 5, e.g. the profile identified by profile identifier value "123". These fields were consequently left in packet 250 for transmittal and the corresponding bits of the fields present field were set.

Figure 16:
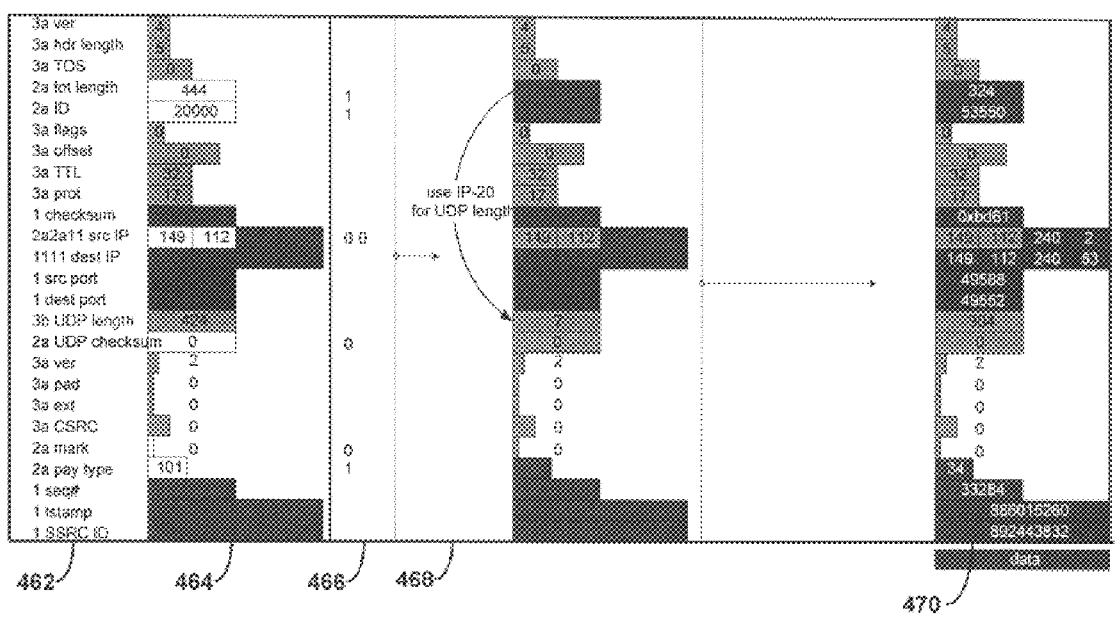
FIG. 16 is a diagram illustrating a method for reconstruction of the compressed packet of FIG. 16 according to the present invention using the profile of FIG. 5.

The process of packet reconstruction for the packet 450 of FIG. 15 is illustrated in FIG. 16. The contents of each packet header field of packet 450 is shown within a box corresponding to the header field. The lightly shaded boxes indicate the compression option 2a fields 16 bit total length, 16 bit ID and payload type that were identified in FIG. 6 as values that differed from the default values of profile 200 of FIG. 5, e.g. the profile identified by profile identifier value "123". These fields were consequently left in packet 250 for transmittal and the corresponding bits of the fields present field were set.

At the receiving server 170, the server first obtains the profile information using the profile identifier value "123". The profile data is used to populate a packet template as shown in column 464 of FIG. 16. Server 170 then applies the fields present field 452 to the data of packet 450 to determine which of the compression option 2a and 2b fields are present. The header fields and compression options for the profile are illustrated in column 462 while the value of the fields present field 452 is shown in column 466. If the bit corresponding to a field is set, then the receiving server 170 uses the value from the received packet to replace the default value in the reconstructed packet template. If the bit is set to '0', then the default value remains in the field.

The result is shown in column 470 where the values "324" "53550" and "34" are inserted for the fields having the corresponding bit set in column 466.

The compression option 1 fields, the fields in the template that are unfilled by the profile, are populated by the corresponding field in received packet 450. The number of unfilled fields in the template will equal the number of fields sent in packet 450 (not counting the data field). The final step is to recalculate the values of the checksum and length fields that were coded with compression option 2b or 3b. In the particular example of FIG. 16, the UDP length field, coded with compression option 3b and default value 424, needs to be recalculated according to a particular formula. One may think of the default value used with compression option 3b as a dynamic default value. In other words, it is never sent, but the correct value can be derived at the receiving server 170 from information included in other fields.

Figure 17:
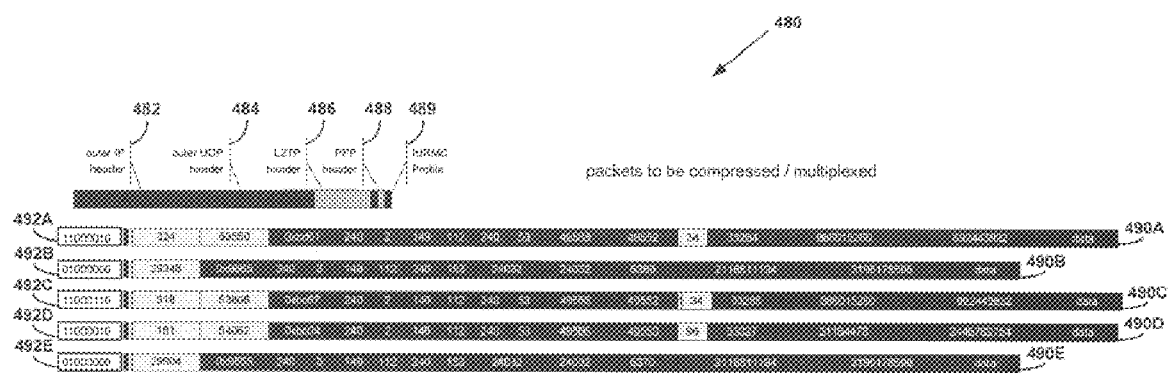
FIG. 17 is a diagram illustrating a contents of multiple packets compressed according to the present invention and multiplexed for transmission through a point to point link.
Figure 18:
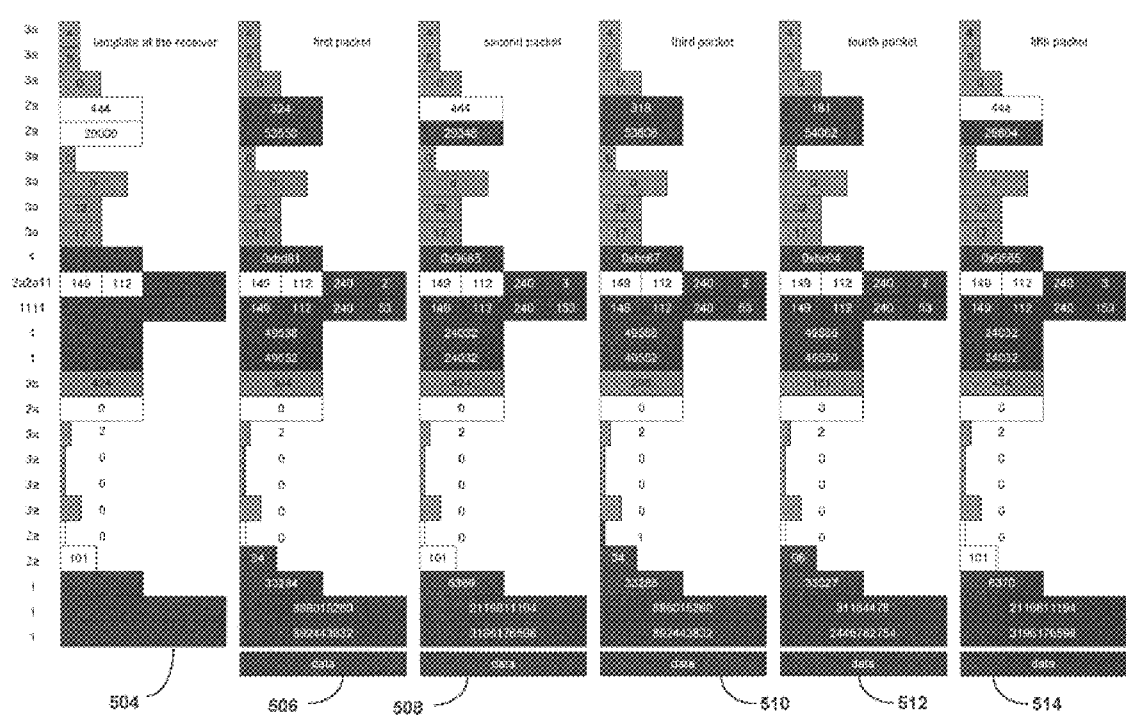
FIG. 18 is a diagram illustrating a method for reconstruction of the multiple compressed packets of FIG. 17 according to the present invention using the profile of FIG. 5.

FIGS. 17 and 18 illustrate the reconstruction process as applied to the multiplexed packets 250, 260, 270, 280 and 290 in FIGS. 6–10, respectively. In FIG. 17, an IURMC packet 480 received by server 170 includes outer IP header 482, outer UDP header 484, L2TP header 486 and PPP header 488 that are used to transmit the multiplexed packet 480. Also included is profile identifier field 489 that contains the profile identifier value "123" that corresponds to profile 200 of FIG. 5. The five multiplexed packets 490A–E (corresponding, respectively, to packets 250, 260, 270, 280 and 290) each have a corresponding fields present field 492A–E, respectively.

The profile identifier "123" is used by server 170 to access profile 200 and populate a packet template shown in column 504 of FIG. 18. The compression option corresponding to each field of the template is shown adjacent the template field in column 502. The first packet is reconstructed from the data present in received packet 490A using the compression options for the fields and the fields present field 492A in the same manner as that discussed above with respect to FIGS. 15 and 16 with the result shown in column 506. The remaining packets 490B–E are similarly reconstructed using their corresponding fields present field 492B–E with the results shown in columns 508–514, respectively, of FIG. 18.

Figure 19A:
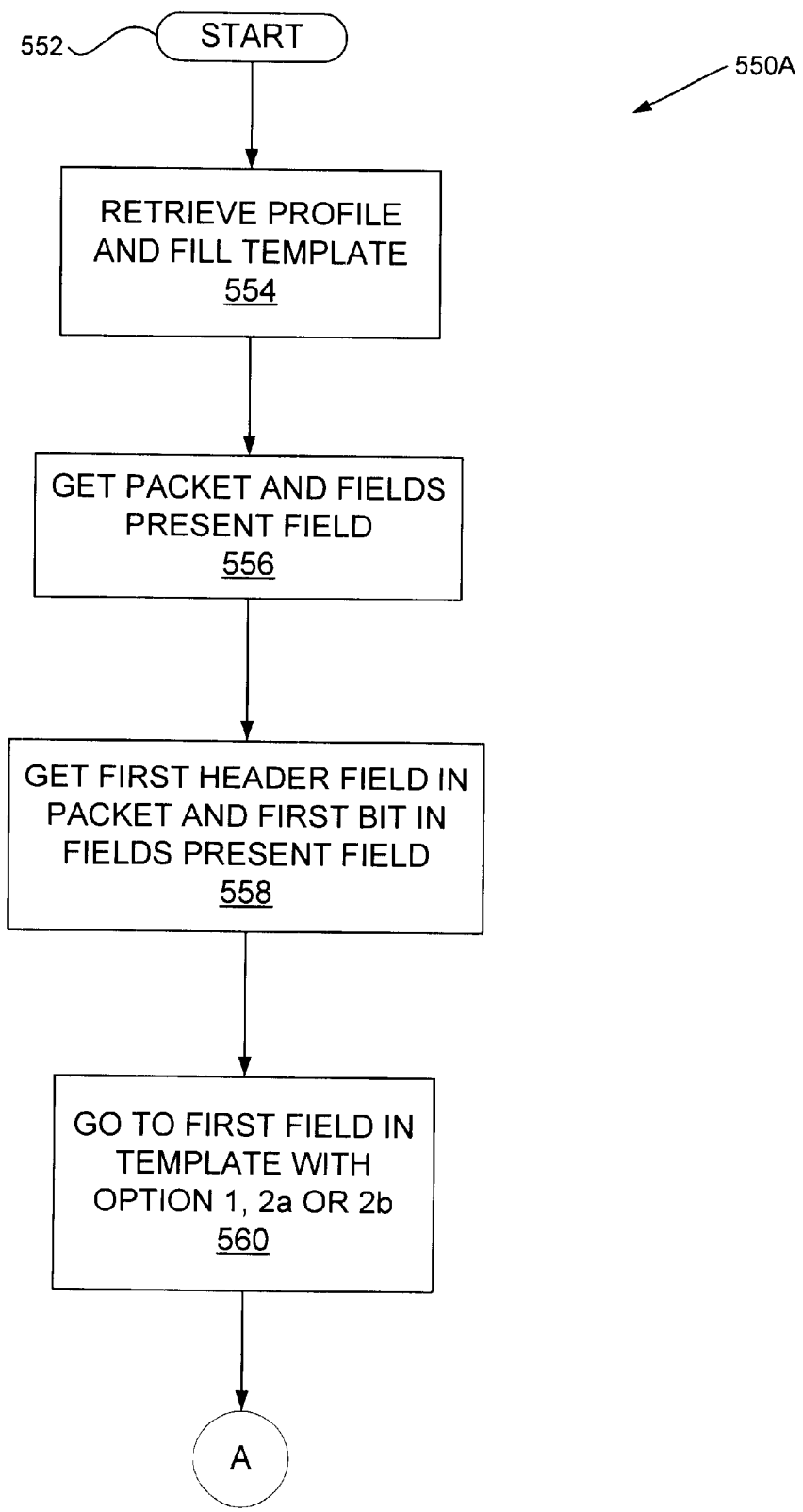
FIGS. 19A and 19B are a flow diagram illustrating an embodiment of a method for reconstructing a compressed packet according to the present invention.
Figure 19B:
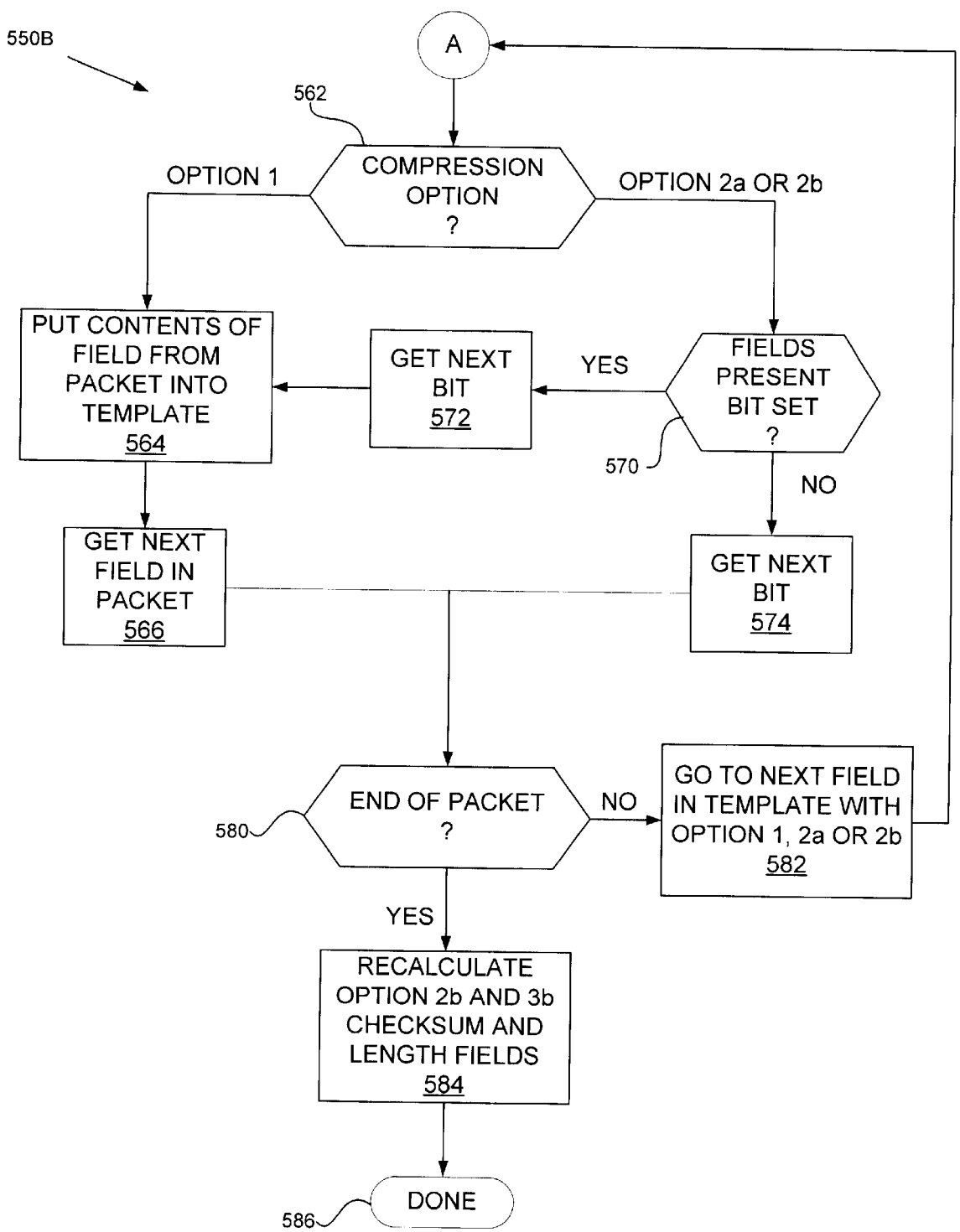

An embodiment of a process 550A–B for reconstructing the compressed packets is shown in FIGS. 19A and 19B. In the initialization portion 550A of the process, at step 554, the profile information is retrieved using the profile identifier that accompanies the received packet. The profile information is used to fill the fields of the packet template with their respective default values, if defined, and to identify the compression options for each field of the template. The received packet and its fields present field are then obtained at step 556.

At step 558, the server gets the first header field of the received packet and the first bit of the fields present field. Processing then proceeds, at step 560, to the first field of the template having compression option 1, 2a or 2b. Processing then proceeds to the field population portion 550B of the process on FIG. 19B through logic node A.

At step 562, control flow switches based upon the compression option of the template field currently under consideration. As a result of step 558 above, the process is initialized to the first field having compression option 1, 2a or 2b. If the compression option of the field is option 1, then control flow branches to step 564. This is a field that is always sent with the packet and the contents of the current field from the packet is inserted into the current field of the template. Processing then moves on to step 566 where the contents of the next field of the packet is retrieved.

If the server finds a next field in the packet at step 566, then control branches at step 580 to step 582. At step 582, the process moves to the next field in the packet template that has compression option 1, 2a or 2b. Processing then returns to logic node A and step 562.

When the compression option of the current field of the template is option 2a or 2b, then this field may or may not have been sent with the packet and control branches from step 562 to step 570 for consideration of the fields present field. At step 570, the state of the current bit is checked. If the bit is set, then the option 2a or 2b field was sent with the packet and control branches to step 572, where the next bit of the fields present field is obtained for consideration in the next loop of the process, and then to step 564 where the contents of the current field of the received packet is loaded into the current field of the template. Control then passes on to step 566 where the next field in the received packet is retrieved.

If, at step 566, there are no more fields in the packet, then control branches at step 580 to step 584. At step 584, the option 2b and option 3b fields in the template are recalculated from the information contained in other headers. For instance, a checksum value having compression option 3b may be recalculated based upon the values in the template at this point. Another example may be a length value, where the UDP length field can be obtain by subtracting 20 bytes from the IP total length field. The selection of compression options and ability to recalculate these types of fields is highly protocol and design dependent.

At this point, reconstruction of the packet is complete and further action can be taken, such as routing of the packet to an end user.

Connection Setup

As was noted above, the point to point link 180 shown in FIG. 4 must be setup between IURMC servers 160 and 170. To configure the point to point link 180 as a IURMC channel according to the present invention, a profile must be established that is known to both servers 160 and 170.

Establishment of the IURMC channel requires an exchange of messages between the servers. In one embodiment of the present invention, these messages are similar to the messages defined in *The PPP Internet Protocol Control Protocol* (IPCP), G. McGregor, IETF RFC 1332, May 1992, herein incorporated by reference for all purposes. These messages are Configure-Request, Configure-Ack, Configure-Nak, Configure-Reject, Terminate-Request, Terminate-Ack, and Code-Reject. The meaning of each for IURMC is as further defined in RFC 1332 and *The Point-To-Point Protocol* (PPP), W. Simpson, IETF RFC 1661, July 1994, herein incorporated by reference for all purposes. The Terminate-Request message is modified in this embodiment to include an IURMC-direction configuration option.

The present invention defines various configuration options used in the Network Control Protocol (NCP) defined for PPP, see RFC 1661. One option is the IURMC direction configuration option. This option is used to indicate the direction of transmission of the IURMC channel and its profile. At least one direction configuration option must be present in each Configure-Request and each Terminate-Request Setup Message. At most two direction configuration options may be present in each Configure-Request and each Terminate-Request Setup Message. If two direction options are present, then each direction option must indicate a different direction. Below is an example of the direction configuration option message information.

| Type | Length | Direction | ProfileID |
|---|---|---|---|
| 1 byte | 1 byte | 1 byte | 1 byte |

Type is a unique identifier for this message. Length is the length of the message, which in this embodiment is 4 bytes. Direction is set to 1 to indicate the direction from the sender of the message to the receiver of the message. Direction is set to 2 to indicate the direction from the receiver of the message to the sender of the message.

For Configure-Request Setup Messages, the ProfileID is the profile identifier associated with the new multiplexing and compression configuration options being configured for the direction indicated by the Direction field. The value chosen for the first ProfileID used in a particular direction can be any number except 0 or 255 in this embodiment and may be chosen at random or in a deterministic manner. The value chosen for ProfileID should thereafter be one greater than the previously used value, wrapping around to 1 after 254 has been reached. The value chosen must not be equal to the previously used value.

The receiver of this configuration option message should not reject the ProfileID value if it is not one greater than the previously used value for that direction. However, the receiver of this option must reject the ProfileID if it is equal to the previously used ProfileID for that direction.

For Terminate-Request Setup Messages, the ProfileID must be set to 0 in this embodiment.

The IURMC-MaxLength option message is used to indicate the maximum length of the sum of the uncompressed and demultiplexed IP/UDP/RTP packets which can be included in one IURMC data packet, as well as the maximum length of the compressed and multiplexed IP/UDP/RTP data packet. Exactly one of these options must be present in this embodiment in each Configure-Request Setup Message which refers to an IURMC channel profile. Below is an example of the IURMC MaxLength option message information.

| Type | Length | Post-IURMC Max Length | IURMC Max Length |
|---|---|---|---|
| 1 byte | 1 byte | 2 bytes | 2 bytes |

Type is a unique identifier for this message. Length is the length of this message, which is 6 bytes in this embodiment. The Post-IURMC Max Length field refers to the maximum sum of the lengths of all packets after decompression and demultiplexing at the receiver. Notice that this is not necessarily equal to the sum of the lengths of all packets before compression and multiplexing at the sender. This is because at setup, some of the fields of the IP/UDP/RTP header may have been set to use a default value. If that field is of variable length, then the decompressed and demultiplexed packet may be of different length than the original. A value of zero in this field indicates that this length is unbounded in this embodiment, and the length of the IURMC packet is limited only by the IURMC Max Length field.

The IURMC Max Length refers to the maximum length of the IURMC data packet sent over the IURMC channel. In this embodiment, two bytes are chosen to represent the maximum length in order to provide for a 64 kilobyte IP packet for possible extension to IPv6.

The IURMC-MaxDelay option is used to indicate the maximum delay that any IP/UDP/RTP packet can incur at the sender before the packet is placed into an IURMC data packet and transmitted. Below is an example of the MaxDelay configuration option message information.

| Type | Length | Max Delay |
|---|---|---|
| 1 byte | 1 byte | 2 bytes |

Type is a unique identifier for this message. Length is the length of this message, which is 4 bytes in this embodiment. Max Delay refers to the maximum delay, in milliseconds, that a IP/UDP/RTP packet can incur at the sender before the packet is placed into an IURMC data packet and transmitted.

The IURMC-FieldCompression option is used to indicate the compression option method used on each field in an IP/UDP/RTP header.

| Type | Length | Field Number | Compression | Default Value |
|---|---|---|---|---|
| 1 byte | 1 byte | 1 byte | 1 byte | Variable Length |

Type is a unique identifier for this message. Length is the length of this message including the Type field, the Length field, the Field Number field, Compression field, and the Default Value field. The Field Number field refers to a particular packet header field of the IP/UDP/RTP packet. Table 3 below is an example of possible values for the Field Number field and their corresponding IP/UDP/RTP packet header fields.

TABLE 3

| Field Number | IP/UDP/RTP presence | Field(s) name(s) | Length (Bytes) |
|---|---|---|---|
| 1 | IP | 4-bit version + 4-bit header length | 1 |
| 2 | IP | 8-bit TOS | 1 |
| 3 | IP | 16-bit total length | 2 |
| 4 | IP | 16-bit ID | 2 |
| 5 | IP | 3-bit flag + 13-bit fragment offset | 2 |
| 6 | IP | 8-bit TTL | 1 |
| 7 | IP | 16-bit header checksum | 2 |
| 8 | IP | first byte of 32-bit source addr | 1 |
| 9 | IP | second byte of 32-bit source addr | 1 |
| 10 | IP | third byte of 32-bit source addr | 1 |
| 11 | IP | fourth byte of 32-bit source addr | 1 |
| 12 | IP | first byte of 32-bit destination addr | 1 |
| 13 | IP | second byte of 32-bit destination addr | 1 |
| 14 | IP | third byte of 32-bit destination addr | 1 |
| 15 | IP | fourth byte of 32-bit destination addr | 1 |
| 16 | IP | variable length options list | N/A |
| 17 | UDP | 16-bit source port | 2 |
| 18 | UDP | 16-bit destination port | 2 |
| 19 | UDP | 16-bit UDP length | 2 |
| 20 | UDP | 16-bit UDP checksum | 2 |
| 21 | RTP | 2-bit version + 1-bit padding marker + 1-bit extension marker + 4-bit CSRC count | 1 |
| 22 | RTP | 1-bit marker bit + 7-bit payload type | 1 |

TABLE 3-continued

| Field Number | IP/UDP/RTP presence | Field(s) name(s) | Length (Bytes) |
|---|---|---|---|
| 23 | RTP | 16-bit sequence number | 2 |
| 24 | RTP | 32-bit timestamp | 4 |
| 25 | RTP | 32-bit SSRC ID | 4 |
| 26 | RTP | variable length CSRC ID list | N/A |
| 27 | RTP | variable length extension | N/A |
| 28 | N/A | padding (always set to 00) | N/A |

The Compression field refers to the compression option for the IP/UDP/RTP header field. Note that fields 1, 3, and 21 must be guaranteed to be a correct value for the protocol in order to assure correct synchronization of field boundaries at the sender and receiver in the presence of variable length fields. Therefore, compression options 2b and 3b are illegal for packet header fields 1, 3, and 21. Packet header field 28 is always set to the value 0.

The IURMC-TieBreaker option is used to break ties in the case where the servers at both ends of the IURMC channel attempt to configure overlapping parameters at the same time. It is included in all Configure-Request packets and all Terminate-Request packets which pertain to the IURMC channel.

| Type | Length | Tie Breaker |
|---|---|---|
| 1 byte | 1 byte | 2 bytes |

Type is a unique identifier for this message. Length is the length of this message, which is always 4 in this embodiment. Tie Breaker contains a random 16-bit number. The tie breaker mechanism in this embodiment is very similar to the Tie-Breaker mechanism defined for L2TP and PPTP. See *Layer Two Tunneling Protocol* "L2TP", K. Hamzeh, A. Rubens, T. Kolar, M. Littlewood, B. Palter, A. Valencia, J. Taarud, W. M. Townsley, G. S. Pall, W. Verthein, IETF Internet Draft <draft-ietf-pppext-l2tp-09.txt>, January 1998.

If one end of the IURMC channel sends a Configure-Request message and receives a Configure-Request message from the other end before receiving a Configure-Ack message from that end, and the messages include overlapping parameters (i.e. one end requests to configure the channel in both directions, and one end requests to configure the channel in the direction away from it), then the Tie Breaker field should be examined in order to resolve the conflict. An embodiment of an algorithm for resolving the conflict is as follows:

1. If the Tie-Breaker of the message sent is greater than the Tie-Breaker of the message received, then the message received should be discarded.
2. If the Tie-Breaker of the message sent is less than the Tie-Breaker of the message received, then the sent message should be discarded. In this case, if the message forgotten was a request to configure a bi-directional channel and the message which was not discarded is a request to configure the channel in only one direction, then the end which discarded the message may attempt to setup the opposite direction concurrently. For example, if end A chooses 10 for the Tie Breaker value and attempts to negotiate a bi-directional channel, and end B chooses the value 20 for the Tie Breaker and attempts to negotiate a channel from end A to end B, then end A may choose to resend its original message modified to configure only in the direction of end B to end A.
3. If the Tie-Breaker value of the message sent equals the Tie-Breaker value of the message received, then both ends should discard the messages sent, choose new Tie-Breaker values, and resend the messages.

Note that if the Configure-Request messages do not overlap (i.e. one end requests to configure the channel in the direction away from it, and the other end requests to configure the channel in the direction away from it), then no contention exists and the Tie-Breaker conflict resolution scheme does not need to be engaged.

Some example of IURMC channel setup scenarios will now be discussed. Other scenarios are possible, but the following examples illustrate a range of possible configuration options and profile negotiation.

In a first example, server 160 of FIG. 4 submits a Configure-Request message to setup IURMC channel 180 to server 170 with the following options:

| | |
|---|---|
| Direction-And-Profile | Direction: 1 (toward receiver) |
| | Profile: 174 |
| Max-Length | 512 |
| Max-Delay | 200 |
| Tie-Breaker | 9374 |
| Field-Compression | Field 1: 4 (option 3a - never sent, guaranteed to be correct) |
| | ... |

Server 170 determines that these parameters are acceptable to it and it submits a Configure-ACK to server 160 with the following options:

| | |
|---|---|
| Direction-And-Profile | Direction: 1 (toward receiver) |
| | Profile: 174 |
| Max-Length | 512 |
| Max-Delay | 200 |
| Tie-Breaker | 9374 |
| Field-Compression | Field 1: 4 (option 3a - never sent, guaranteed to be correct) |
| | ... |

The profile having profile identifier 174 applies to traffic from server 160 to server 170, and applies compression option 3a to field 1 along with a default value of 4.

In a second example, server 160 submits a Configure-Request to setup an IURMC channel to server 170 with the following options:

| | |
|---|---|
| Direction-And-Profile | Direction: 1 (toward receiver) |
| | Profile: 174 |
| Max-Length | 512 |
| Max-Delay | 200 |
| Tie-Breaker | 9374 |
| Field-Compression | Field 1: 4 (option 3a - never sent, guaranteed to be correct) |
| | ... |
| | Field 7: 5 (option 3b - never sent, not guaranteed to be correct) |

Notice that field number 7 (the IP header checksum field) is set to option 3b. This puts the burden of checksum recalculation on the receiver of such an IURMC packet, which is server 170 in this case. For this example, server 170 refuses to accept this computational burden, based upon its processor occupancy level, for example. Instead, server 170 responds by submitting a Configure-NAK to Server 160 with the following options:

| Direction-And-Profile | Direction: 1 (toward receiver) Profile: 174 |
|---|---|
| Max-Length | 512 |
| Max-Delay | 200 |
| Tie-Breaker | 9374 |
| Field-Compression | Field 7: 2 (option 2a - sometimes sent, guaranteed to be correct) |

At this point, Server 160 may decide to end the negotiation if it is also unwilling to accept the checksum recalculation burden (based, for example, upon its own processor occupancy level) For this example, however, server 160 accepts the burden and re-submits the following Configure-Request with field 7 set to compression option 2a.

| Direction-And-Profile | Direction: 1 (toward receiver) Profile: 174 |
|---|---|
| Max-Length | 512 |
| Max-Delay | 200 |
| Tie-Breaker | 9374 |
| Field-Compression | Field 1: 4 (option 3a - never sent, guaranteed to be correct) ... Field 7: 2 (option 2a - sometimes sent, guaranteed to be correct) |

A third example is similar to example 2 except that server 170 accepts the computation burden of checksum recalculation because its network load is low and it has the resources to devote to this function, e.g. processor occupancy is below a predetermined threshold and thus no over-capacity condition exists. However, the network load on server 170 later increases and server 170 determines that the checksum recalculation burden is too great, e.g. processor occupancy exceeds the predetermined threshold. Server 170 then renegotiates the profile for the IURMC channel by submitting a Configure-Request message to Server 160 with a new profile identifier value and the following options:

| Direction-And-Profile | Direction: 2 (toward sender) Profile: 175 |
|---|---|
| Max-Length | 512 |
| Max-Delay | 200 |
| Tie-Breaker | 4951 |
| Field-Compression | Field 1: 4 (option 3a - never sent, guaranteed to be correct) ... Field 7: 2 (option 2a - sometimes sent, guaranteed to be correct) |

Notice that the profile ID has changed and is one greater than the previous profile identifier value. Also note that the value of the direction indicator is different from profile 174. The direction of the IURMC channel has not changed, but the identifier is different because it is now server 170 that is issuing the request. Assume that the compression options for all the fields of profile 175 are identical to profile 174 except that field 7 has been changed to option 2a in order to shift the checksum recalculation burden to Server 160.

For this third example, further assume that server 160 accepts the new configuration parameters. Server 160 will then submit a Configure-ACK message to server 170 with the following values:

| Direction-And-Profile | Direction: 2 (toward sender) Profile: 175 |
|---|---|
| Max-Length | 512 |
| Max-Delay | 200 |
| Tie-Breaker | 4951 |
| Field-Compression | Field 1: 4 (option 3a - never sent, guaranteed to be correct) ... Field 7: 2 (option 2a - sometimes sent, guaranteed to be correct) |

For the fourth example, consider the case of the third example again, except assume that server 160 decides not to accept the computational burden of checksum recalculation. Server 160 will then submit a Configure-NAK to server 170 with the following values:

| Direction-And-Profile | Direction: 2 (toward sender) Profile: 175 |
|---|---|
| Max-Length | 512 |
| Max-Delay | 200 |
| Tie-Breaker | 4951 |
| Field-Compression | Field 7: 5 (option 3b - never sent, not guaranteed to be correct) |

Server 170 then determines that the IURMC channel should be taken down, since neither server has the capacity to accept the burden of checksum recalculation. Server 170 then sends a Terminate-Request message to server 160, thereby terminating the IURMC channel of point to point link 180.

PPP Implementation

As mentioned above, the present invention is suitable for use in many different types of point to point links. Much of the discussion above was in the context of an L2TP tunnel as the point to point link. However, the present invention can also be implemented in a PPP link. However, because the method of the present invention is not defined as a standard, it does not have an assigned number from the Internet Assigned Numbers Association (IANA) denoting it as a PPP information payload protocol. Therefore, another embodiment of the present invention as a stand-alone protocol within PPP will now be described.

When implemented as a stand-alone protocol within PPP, an IURMC channel according to the present invention is setup in much the same way as a channel for any other protocol is setup in PPP. After the PPP channel is setup using PPP's Link Control Protocol (LCP), the individual network protocols are setup using their associated Network Control Protocol (NCP). After the NCP phase is complete for a particular protocol, packets of that protocol type can be sent over the PPP channel.

The numbers associated with the seven setup message codes (Configure-Request, Configure-Ack, Configure-Nak, Configure-Reject, Terminate-Request, Terminate-Ack, and Code-Reject) are identical to the numbers assigned to the corresponding message codes in PPP's LCP.

Figure 20:
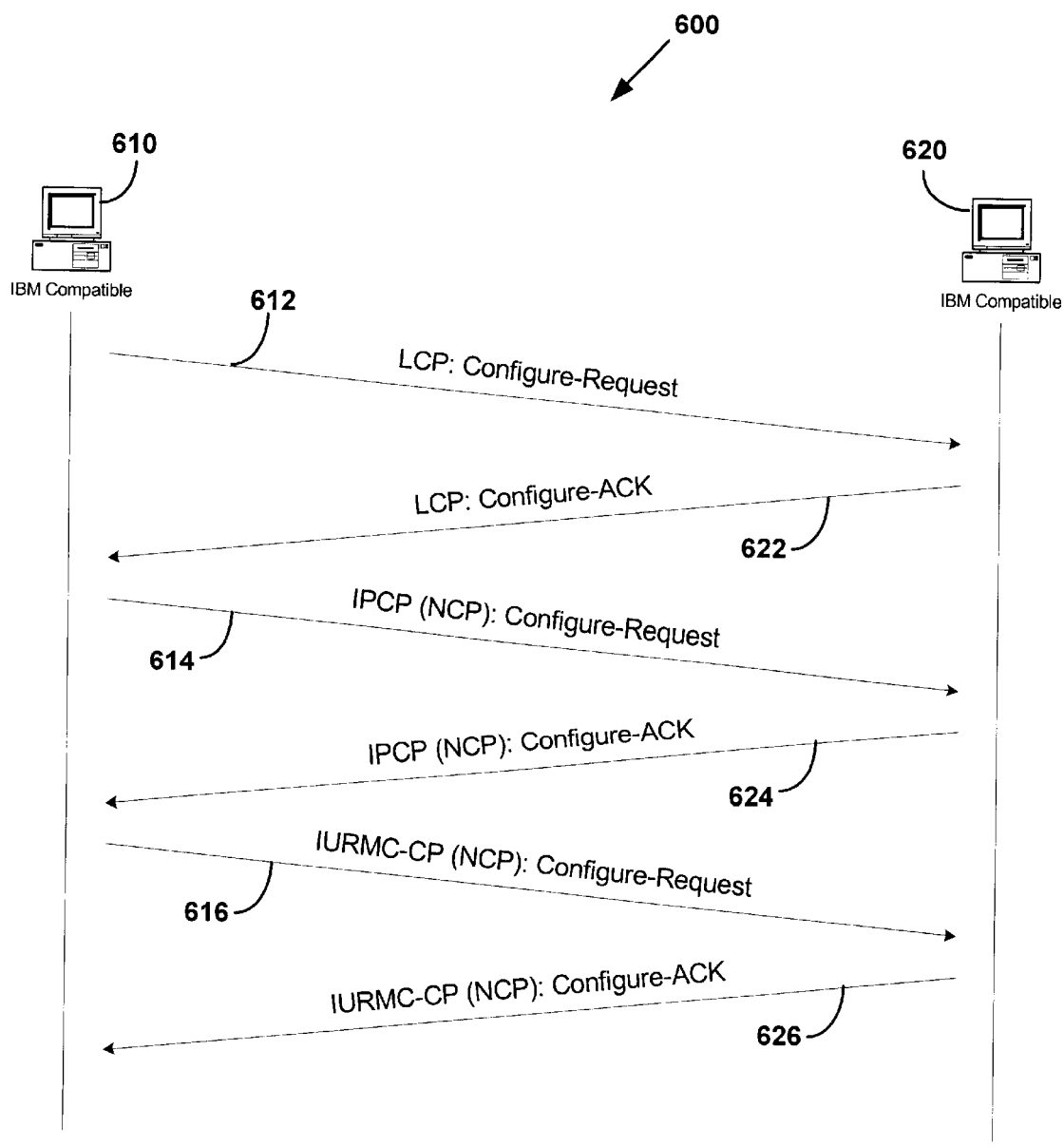
FIG. 20 is a network messaging diagram illustrating an embodiment of a negotiation of a profile according to the present invention.

Consider channel setup scenario 600 illustrated in FIG. 20. In scenario 600, network devices 610 and 620 wish to connect using PPP in order to establish an IURMC channel for the exchange of IP and IP/UDP/RTP packets.

Device 610 initiates establishment of the connection with an LCP: Configure-Request message 612 to device 620. The initial LCP: Configure-Request packet contents is as follows:

| Protocol | Information | | | | | | |
|---|---|---|---|---|---|---|---|
| | Code | Identifier | Length | Data | | | |
| LCP 0xC021 | Configure-Request 1 | 124 | 8 | Type | Length | Data | |
| | | | | Maximum-Receive-Unit 1 | 4 | 2, 0 | |

This packet is an encapsulated packet in PPP, as described in RFC 1661. The Protocol contained in the Information section of this PPP packet is hexadecimal 0xC021, which is the code for the Link Control Protocol of PPP. A similar packet 622 is sent from device 620 to device 610 with the Configure-ACK code if all parameters are acceptable to device 620.

Device 610 then sends IPCP: Configure-Request packet 614 that contains the following data:

| Protocol | Information | | | | | | |
|---|---|---|---|---|---|---|---|
| | Code | Identifier | Length | Data | | | |
| IPCP 0x8021 | Configure-Request 1 | 94 | 10 | Type | Length | Data | |
| | | | | IP-Address 3 | 6 | 10, 0, 0, 94 | |

The Protocol contained in the Information section of this PPP packet 614 is hexadecimal 0x8021, which is the code for the Internet Protocol Control Protocol (IPCP) for PPP. If all the parameters are acceptable to device 620, then it responds with a similar packet 624 sent to device 610 that contains the Configure-ACK code.

Figure 21:
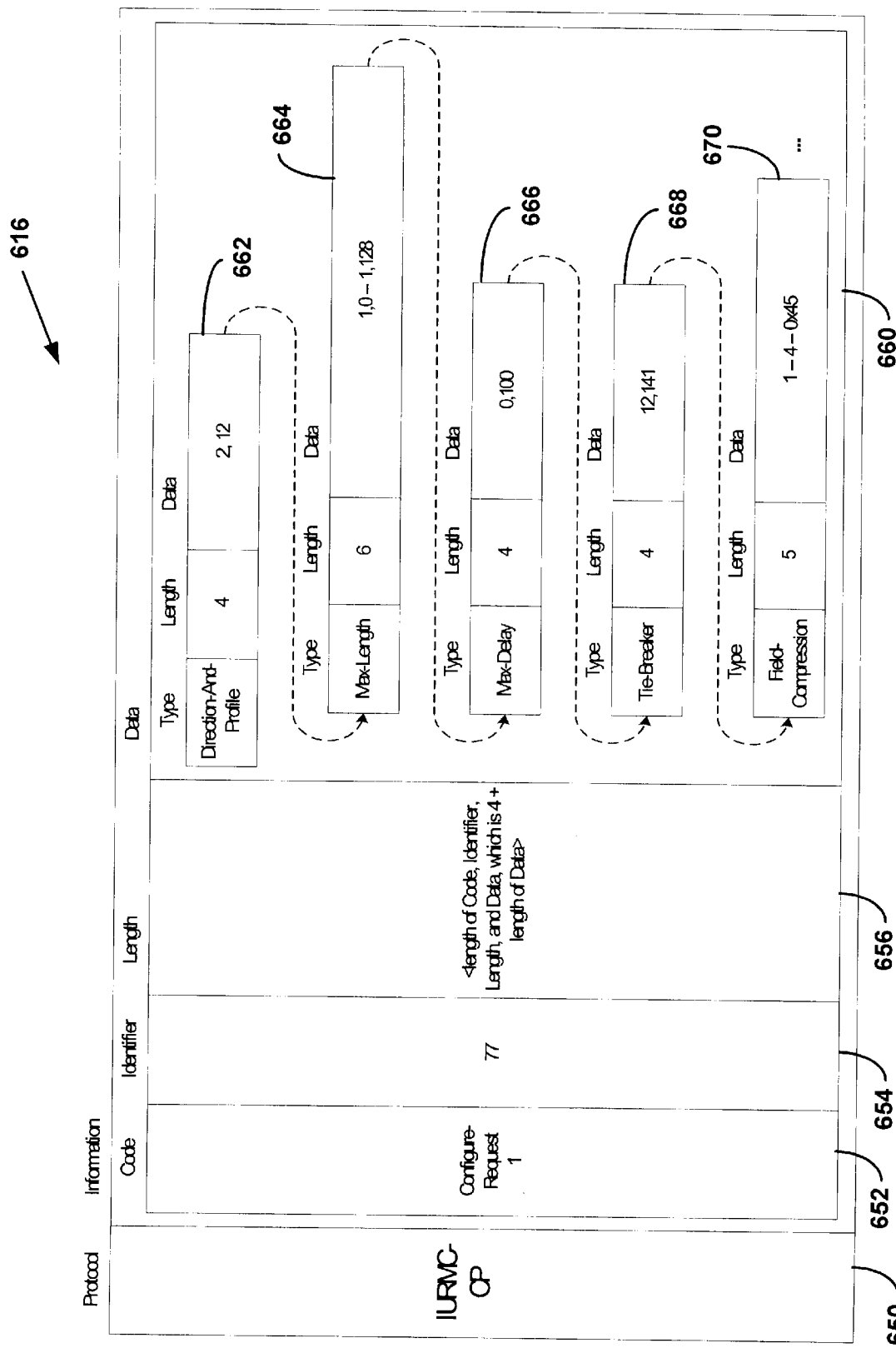
FIG. 21 is a diagram illustrating an embodiment of a message for negotiating a profile according to the present invention.

Device 610 will then send an IURMC-CP: Configure-Request packet 616 to device 620 that defines the profile under negotiation. The content of packet 616 is shown in FIG. 21. The IURMC-CP field 650 requires a unique identifier. However, because an IURMC protocol incorporating the present invention has not been issued a unique Protocol number to denote this protocol within PPP, no number appears in the Protocol field of encapsulated PPP packet 616.

The code field 652 of packet 616 contains the Configure-Request code value "1". The identifier field 654 is a unique identifier for packet 616. Length field 656 contains a value reflecting the length of the code field 652, identifier field 654, length field 656 and data field 660, which is 4 plus the length of data field 660.

Data field 660 for packet 616 contains the kind of configuration option messages that were discussed above. Option message 662 contains the direction and profile information for the profile being proposed by the packet 616. Linked to direction and profile message 662 is max-length option message 664 that proposes a maximum length in the range of 0 to 128 messages. Linked to message 664 is maximum delay message 666 that proposes a maximum delay of 100 milliseconds. Linked to message 666 is tie-breaker message 668 that specifies a tie-breaker value of "12,141". Linked to message 668 is compression option message 670 that proposes for field "1" a compression option of "1" i.e. compression option 3*a*, and a default value of 0×45. Linked to message 670 would be further compression type messages that would define the profile information for each of the remaining packet header fields. These additional messages have been omitted in the interest of brevity.

If device 620 accepts all the parameters of packet 616, it will respond by sending a similar packet 626 to device 610 with the Configure-ACK code.

The method according to the present invention supports the compression of packet header information in a point to point link using a minimal amount of shared state between the two ends of the link. The present invention has various advantages over conventional RTP multiplexing and compression techniques when applied to high-volume traffic over high speed links, such as VoIP traffic. Although the present invention is described in the context of an L2TP tunnel and a PPP stack, the present invention is applicable to any point to point communications link.

It should be understood that the programs, processes, methods, systems and apparatus described herein are not related or limited to any particular type of computer apparatus (hardware or software), unless indicated otherwise. Various types of general purpose or specialized computer apparatus may be used along with the present invention or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams. In addition, the present invention can be practiced with software, hardware, or a combination thereof.

The claims should not be read as limited to the described order or elements unless stated to that effect Therefore, all embodiments that come within the scope and spirit of the following claims and equivalents thereto are claimed as the invention.

We claim:

1. A method for compression of packet header information in a point to point link, the method comprising the steps of:

establishing a point to point link between first and second network devices;

negotiating a first profile between the first and second network devices for packet traffic from the first network device to the second network device through the point to point link, where the first profile has a first profile identifier and a first default packet header value for a first packet header field;

receiving a first packet in the first network device from a first endpoint coupled to the first network device, where the first packet is addressed to a second endpoint coupled to the second network device;

if a value of the first packet header field of the first packet matches the first default packet header value for the first packet header field in the first profile, then:

removing the first packet header field from the first packet, and sending the first packet along with the first profile identifier from the first network device to the second network device through the point to point link;

receiving the first packet along with the first profile identifier at the second network device;

using the first profile identifier sent with the first packet to retrieve the first profile in the second network device; and inserting the first default packet header value from the first profile into the first packet header field of the first packet at the second network device.

2. The method of claim 1 further includes:

receiving a second packet in the first network device from a third endpoint coupled to the first network device, where the second packet is addressed to a fourth endpoint coupled to the second network device;

if a value of the first packet header field of the second packet matches the first default packet header value for the first packet header field in the first profile, then:

removing the first packet header field from the second packet, combining the first and second packets; and sending the combined first and second packets from the first network device to the second network device through the point to point link;

the step of receiving the first packet at the second network device further comprises receiving the combined first and second packets in the second network device; and the step of inserting the first default packet header value from the first profile into the first packet header field of the first packet further includes inserting the first default packet header value from the first profile into the first packet header field of the second packet.

3. The method of claim 1, wherein:

the step of negotiating a first profile between the first and second network devices includes selecting the first packet header field to be an optional field;

the step of removing the first packet header field from the first packet further comprises removing the first packet header field from the first packet only when the value of the first packet header field matches the first default packet header value of the first profile; and the step of inserting the first default packet header value from the first profile into the first packet header field of the first packet at the second network device further comprises inserting the first default packet header value from the first profile into the first packet header field of the first packet at the second network device only when the first packet header field is not present in the first packet received by the second network device.

4. The method of claim 1, wherein:

the step of negotiating a first profile between the first and second network devices includes selecting a second default packet header value for a second packet header field to be a non-guaranteed value, where the second packet header field contains a value that can be calculated from a contents of each packet; and the method further includes the steps of:

removing the second packet header field from the first packet; and recalculating a value for the second packet header field in the second network device from the contents of the first packet.

5. The method of claim 4, further including the steps of:

sending a new profile request from the second network device to the first network device that requests that the second default packet header value for the second packet header field be a guaranteed value, where the new profile request includes a second profile identifier;

sending a new profile acknowledge from the first network device to the second network device when the first network device determines that the first network device can recalculate the value of the second packet header field and establishing a second profile with the second profile identifier with the second default packet header value for the second packet header field selected to be guaranteed; and sending a new profile not-acknowledge from the first network device to the second network device when the first network device determines that the first network device cannot recalculate the value of the second packet header field.

6. The method of claim 5, where the step of sending a new profile request from the second network device to the first network device includes sending the new profile request when activity on the second network device reaches a capacity threshold.

7. The method of claim 1, where the step of sending the first packet along with the first profile identifier includes:

placing the first packet in a first queue corresponding to the first profile; and sending each packet in the first queue together from the first network device to the second network device along with the first profile identifier.

8. The method of claim 7, the method including the steps of:

receiving a second packet in the first network device; and if a value of the first packet header field of the second packet matches the first default packet header value for the first packet header field in the first profile, then place the second packet in the first queue.

9. The method of claim 1, the method further comprising the steps of:

negotiating a second profile between the first and second network devices for packet traffic from the first network device to the second network device through the point to point link, where the second profile has a second profile identifier and a second default packet header value for a second packet header field;

receiving a second packet in the first network device from the first endpoint coupled to the first network device;

if a value of the second packet header field of the second packet matches the second default packet header value for the second packet header field in the second profile, then:

removing the second packet header field from the second packet, and placing the second packet in a second queue corresponding to the second profile; and sending the packets in the second queue together from the first network device to the second network device along with the second profile identifier;

receiving the packets in the second queue along with the second profile identifier at the second network device;

using the second profile identifier sent with the packets in the second queue to retrieve the second profile in the second network device; and inserting the second default packet header value from the second profile into the second packet header field of the second packet at the second network device.

10. The method of claim 1, the method further comprising the steps of:

detecting when a predetermined number of packets sent by the first network device to the second network device through the point to point link have a same value for the first packet header field that differs from the first default packet header value of the first profile; and responsive to detecting the predetermined number of packets having the same value for the first packet header field, negotiating a second profile between the first and second network devices to replace the first profile, where the second profile has a second profile identifier and uses the same value as a second default packet header value for the first packet header field of the second profile.

11. A system for exchanging packets, the system comprising first and second network devices for connection to a network and transmission of packets, where:

each of the first and second network devices is configured to support a point to point link between the first and second network devices through the network, and negotiate a profile shared by the first and second network devices, where the profile includes a profile identifier and a default value for a first packet header field;

the first network device is further configured to receive a first packet and, if a value of the first packet header field of the first packet matches the default value of the first packet header field of the profile, remove the first packet header field from the first packet and transmit the profile identifier and the first packet to the second network device through the point to point link; and the second network device is further configured to receive the profile identifier and the first packet from the first network device through the point to point link, use the profile identifier sent with the first packet to obtain the default value for the first packet header field from the profile, insert the default value into the first packet header field into the first packet, and retransmit the first-packet.

12. The system of claim 11, wherein the first and second network devices are configured to negotiate the profile such that the profile includes a default value for a second packet header field and where:

the first network device is further configured to compare a value of the second packet header field of the first packet to the default value for the second packet header field of the profile and:

if the value of the second packet header field of the first packet differs from the default value for the second packet header field of the profile, then the first network device leaves the second packet header field in the first packet and sets a corresponding bit of a fields present field, if the value of the second packet header field of the first packet is the same as the default value for the second packet header field of the profile, then the first network device removes the second packet header field from the first packet and clears the corresponding bit of the fields present field, and the first network device transmits the fields present field along with the profile identifier and the first packet; and the second network device is further configured to check the corresponding bit of the fields present field sent along with the profile identifier and the first packet and, if the bit corresponding to the second packet header field is clear, then the default value for the second packet header field from the profile is inserted into the first packet.

13. The system of claim 11, wherein:

the first network device is further configured to:

place the first packet in a queue for the profile before transmitting the first packet, receive a second packet and, if a value of the first packet header field of the second packet matches the default value of the first packet header field of the profile, remove the first packet -header field from the second packet and place the second packet in the queue for the profile, and combine the first and second packets in the queue with the profile identifier for transmission to the second network device; and the second network device is further configured to receive the first and second packets combined with the profile identifier from the first network device and, after obtaining the default value for the first packet header field from the profile using the profile identifier, insert the default value for the first packet header field into the first packet header field of the first and second packets.

14. The system of claim 11, where:

the first and second network devices are configured to negotiate a second profile having another profile identifier and another default value for the first packet header that is different from the default value of the first profile;

the first network device is further configured to compare the value of the first packet header of the first packet to the another default value for the first packet header of the second profile and, if the value of the first packet header of the first packet matches the another default value, the n removing the first packet header of the first packet and transmitting the first packet with the another profile identifier of the second profile to the second network device; and the second network device is further configured to receive the first packet with the another profile identifier of the second profile, use the another profile identifier to obtain the another default value from the second profile and insert the another default value into the first packet header of the first packet.

15. The system of claim 11, where:

the first and second network devices are further configured to negotiate that a value of a second packet header in the profile be determined from an other field in the first packet by the second network device;

the first network device is further configured to remove the second packet header from the first packet before transmitting the first packet with the profile identifier to the second network device; and the second network device is further configured to determine from the profile obtained using the profile identifier that the second packet header is to be determined from the other field in the first packet, calculate the value of the second packet header using a value of the other field, and insert the calculated value into the second packet header of the first packet.

16. The system of claim 15, where:

the second network device is further configured to detect an over-capacity condition in the second network device and, responsive thereto, send a request to the first network device for establishment of a second profile, where the second profile has another profile identifier and a default value for the second packet header; and the first network device is further configured to send an acknowledge to the second network device, responsive to the request for establishment of the second profile, and use the second profile in place of the first profile, if the first network device determines that a burden of calculating the value of the second packet header does not cause an over-capacity condition in the first network device and to send a not acknowledge to the second network device if the first network device determines that the burden of calculating the value of the second packet header does cause the over-capacity condition in the first network device.

17. The system of claim 11, where:

the first network device is further configured to detect when a predetermined number of packets have a same value for the first packet header that differs from the default value for the first packet header in the profile and, responsive thereto, send a request to the second network device for establishment of a second profile, where the second profile has another profile identifier and another default value for the first packet header;

the second network device is further configured to send an acknowledge to the first network device, responsive to the request for establishment of the second profile, and establish the second profile;

the first network device is still further configured, responsive to the acknowledge from the second network device and upon receiving a second packet having a value for the first packet header that matches the another default value for the first packet header of the second profile, to remove the first packet header of the second packet and combine the second packet with the another profile identifier for transmission to the second network device through the point to point link; and the second-network device is still further configured, responsive to receiving the second packet with the another profile identifier, to obtain the another default value for the first packet header from the second profile using the another profile identifier for insertion into the first packet header of the second packet.

18. A network device for transmitting and receiving packets in a network, the network device comprising:

connection means for establishing a point to point link with an other network device through the network;

profile negotiating means for negotiating a first profile with the other network device, where the first profile has a first profile identifier value and a first default value for a first packet header;

storing means for storing negotiated profiles and for storing compression options and default values for packet headers;

receiving means for receiving a packet for transmission through the point to point ink to the other network device; and compression means for compressing the received packet, where the compression means removes the first packet header from the received packet and combines the received packet with the first profile identifier value for transmission to the other network device when a value of the first packet header of the received packet matches the first default value.

19. The network device of claim 18, the device including:

packet reconstruction means for receiving from the other network device a compressed packet with the first profile identifier value, using the first profile identifier value to obtain the first default value from the first profile, and inserting the default value into the first packet header of the compressed packet.

20. The network device of claim 18, where the compression means is further configured to place the received packet in a queue for the first profile, and remove the first packet header from an other received packet, when a value of the first packet header of the other received packet matches the first default value of the first profile, placing the other received packet on the queue for the first profile, and combine the received packet, the other received packet and the first profile identifier value for transmission to the other network device.

21. The network device of claim 18, where the compression means is further configured to remove the first packet header from the received packet only when the value of the first packet header of the received packet matches the first default value and set a bit corresponding to the first packet header in a fields present field, and combine the received packet with the first profile identifier value and the fields present field for transmission to the other network device.

22. The network device of claim 21, the device including packet reconstruction means for receiving from the other network device a compressed packet with the first profile identifier value and the fields present field, using the first profile identifier value to obtain the first default value from the first profile, and, only when the bit corresponding to the first packet header in the fields present field is set, inserting the default value into the first packet header of the compressed packet.

23. The network device of claim 18, the device further including monitoring means for:

detecting when a predetermined number of packets received by the network device for transmission to the other network device through the point to point link have a same value for the first packet header field that differs from the default value for the first packet header in the first profile;

negotiating a second profile with the other network device having a second profile identifier and the same value for the first packet header; and replacing use of the first profile with use of the second profile by the compression means.

24. The network device of claim 18, where the negotiating means is further configured to identify in the first profile a second packet header that can be recalculated from a value of an other packet header, and the network device includes packet reconstruction means for receiving from the other network device a compressed packet with the first profile identifier value, using the first profile identifier value to identify the second packet header, calculate a value for the second packet header from the value of the other packet header in the compressed packet, and insert the calculated value into the second packet header of the compressed packet.

25. The network device of claim 24, the network device including over-capacity detection means for detecting an over-capacity condition in the network device, requesting a second profile with the other network device, where the second profile has a second profile identifier and the profile identifies the second packet header as a field that must be calculated from the other field before transmission and not removed by the compression means.

* * * * *